Aug. 23, 1960   P. R. HOFFMAN ET AL   2,949,846
PRINTING MECHANISM
Filed March 28, 1958                                     17 Sheets-Sheet 7
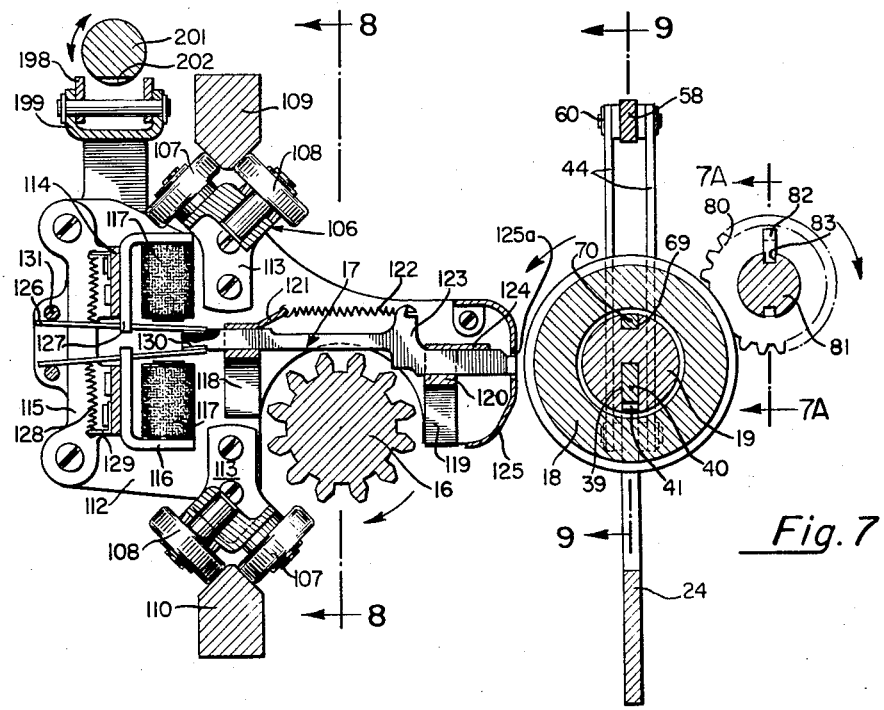
Fig. 7
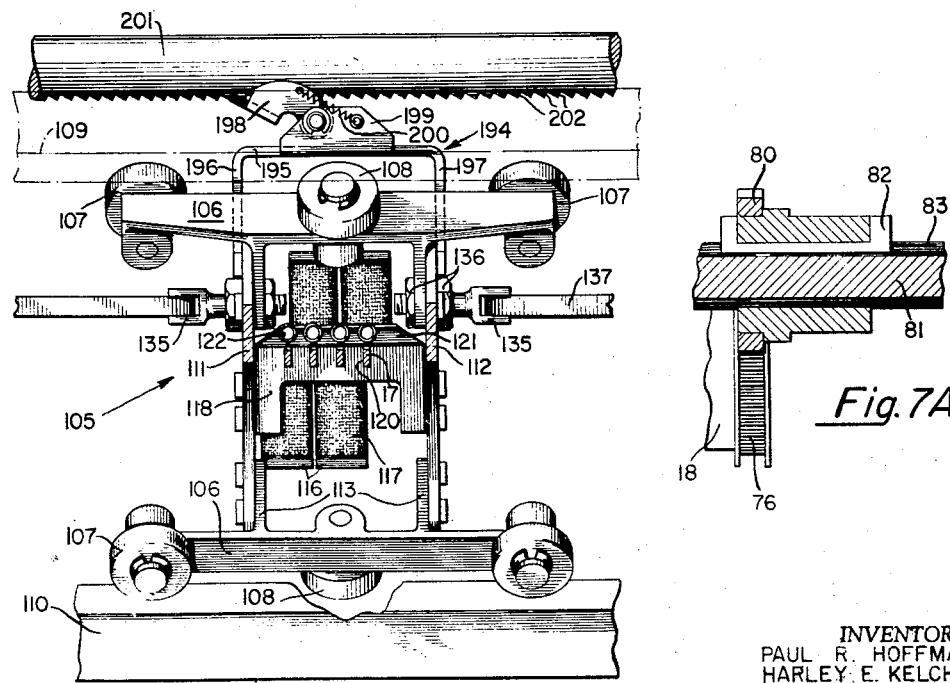
Fig. 8
Fig. 7A
INVENTORS.
PAUL R. HOFFMAN
HARLEY E. KELCHNER
FRANK H. MOORE, JR.
EDWIN A. FRICKE, JR.
BY William R. Nolte
AGENT

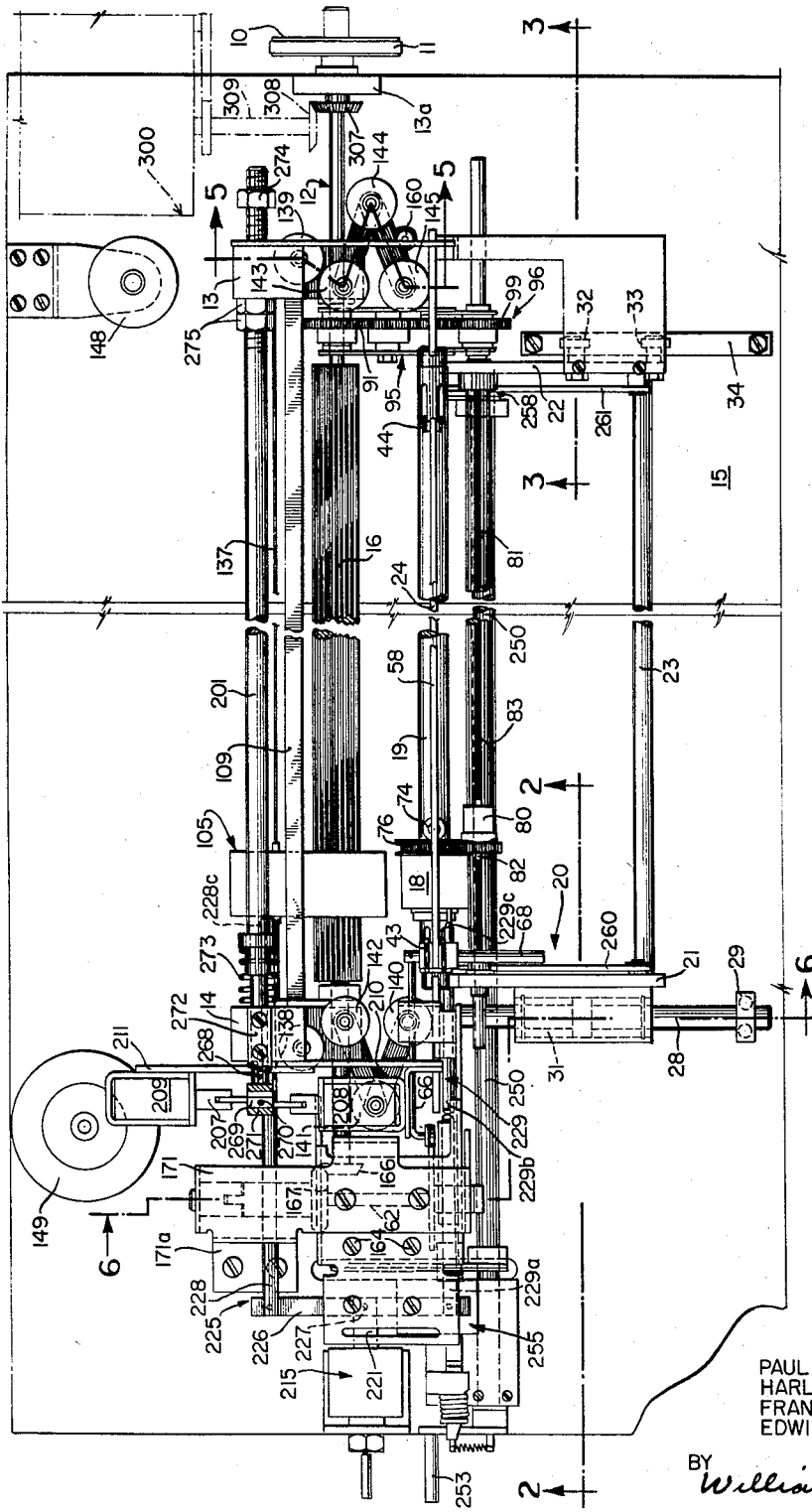

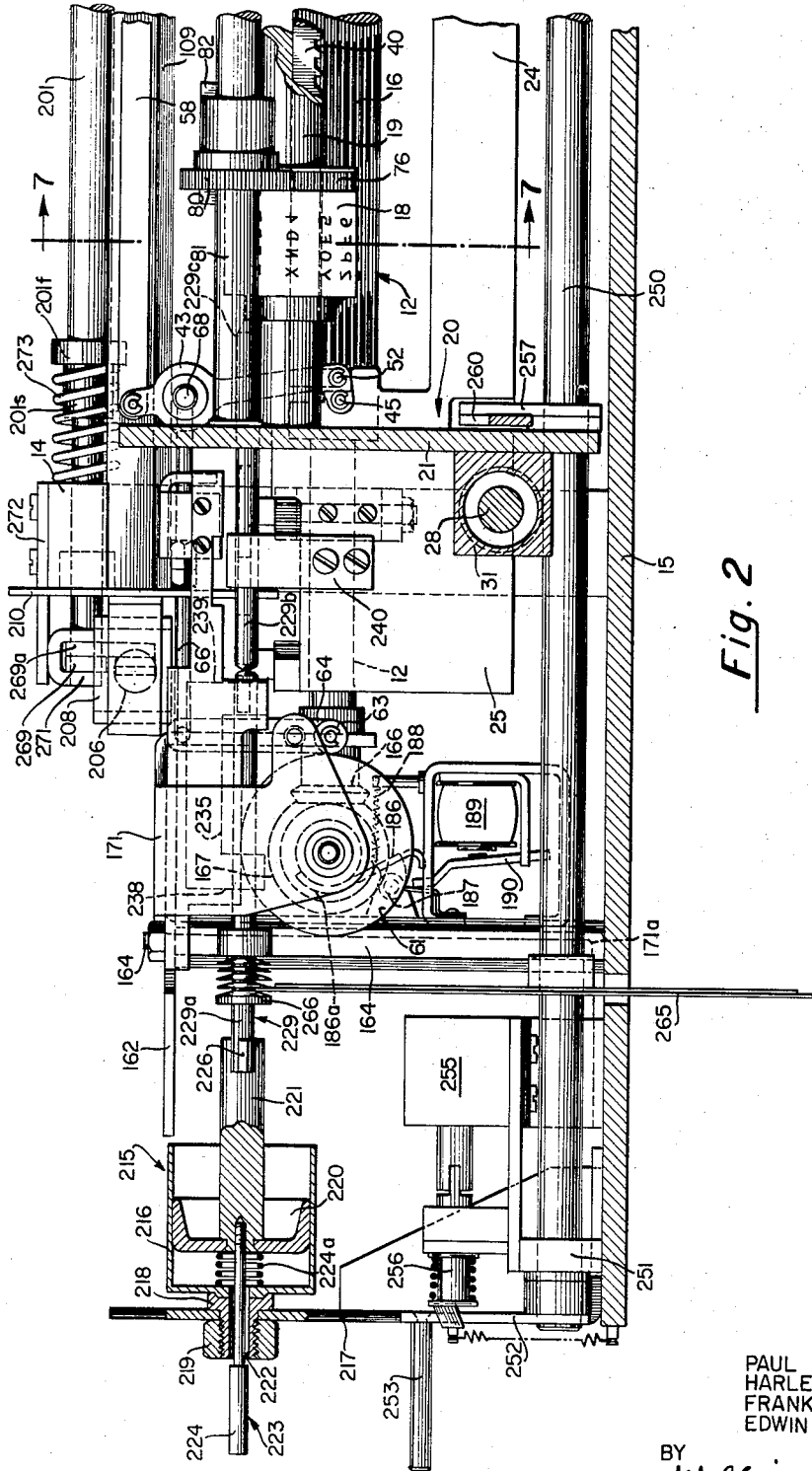

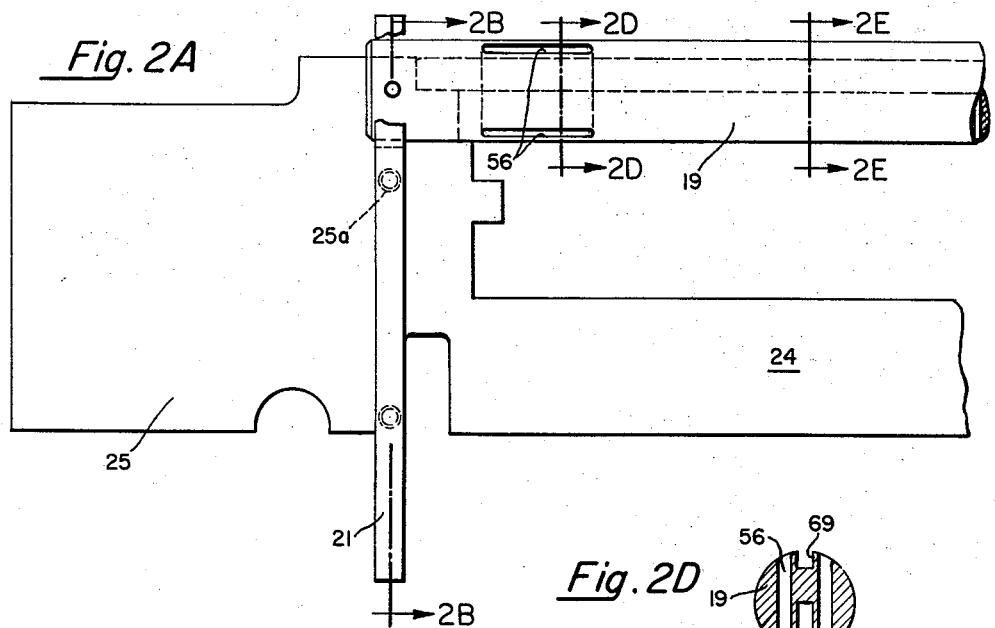
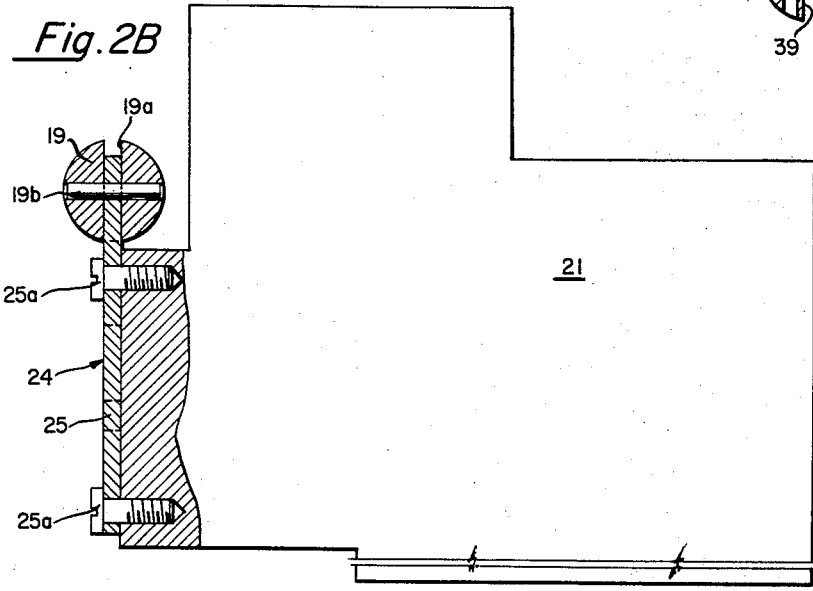
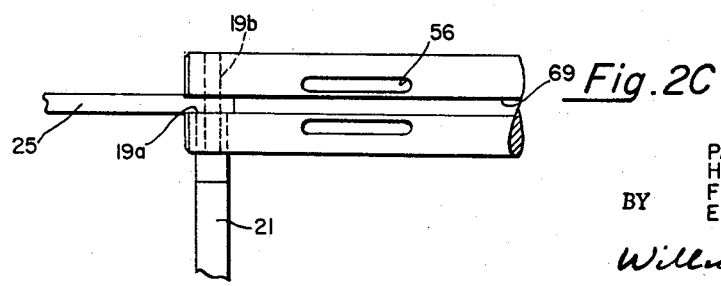

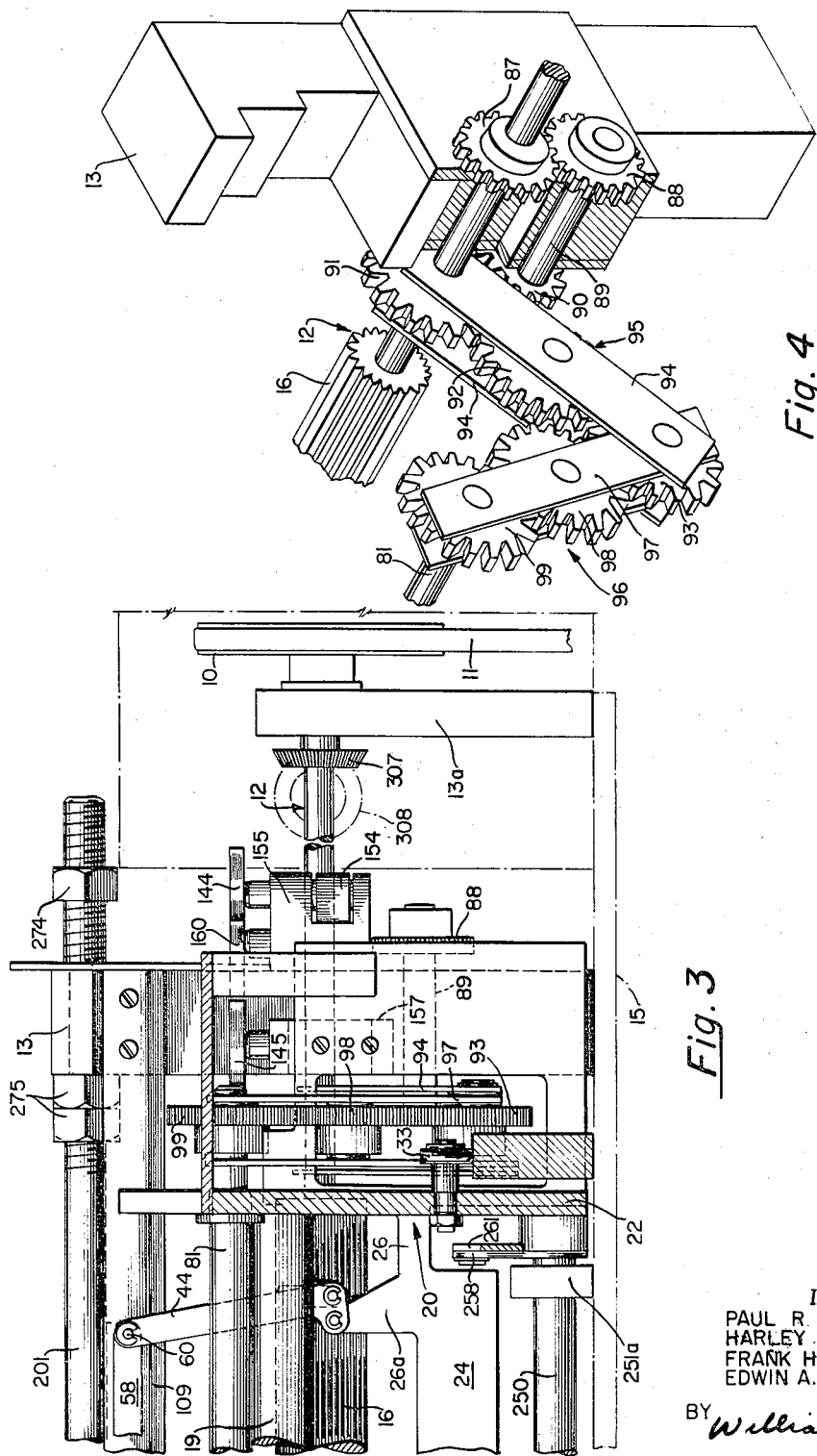

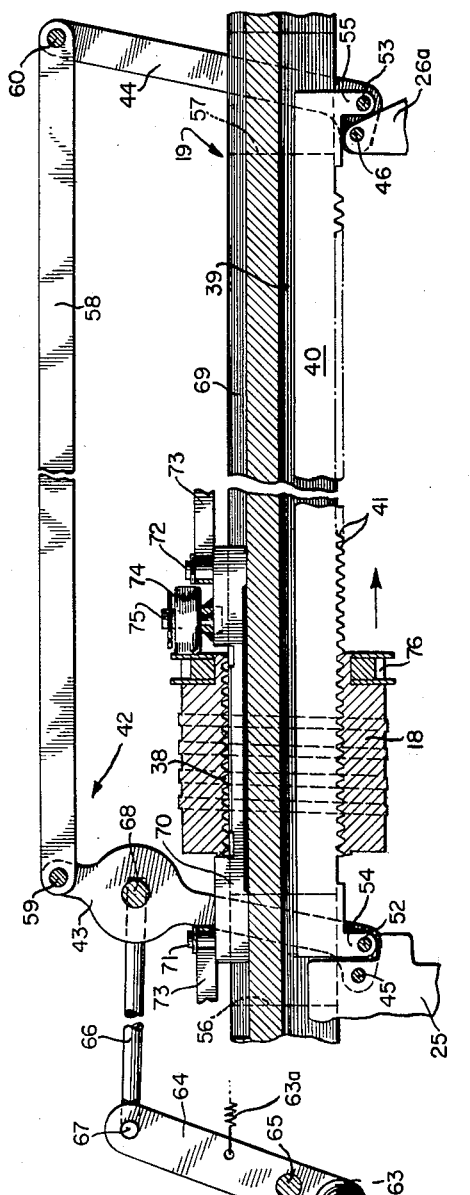

Aug. 23, 1960     P. R. HOFFMAN ET AL     2,949,846
PRINTING MECHANISM
Filed March 28, 1958     17 Sheets-Sheet 9
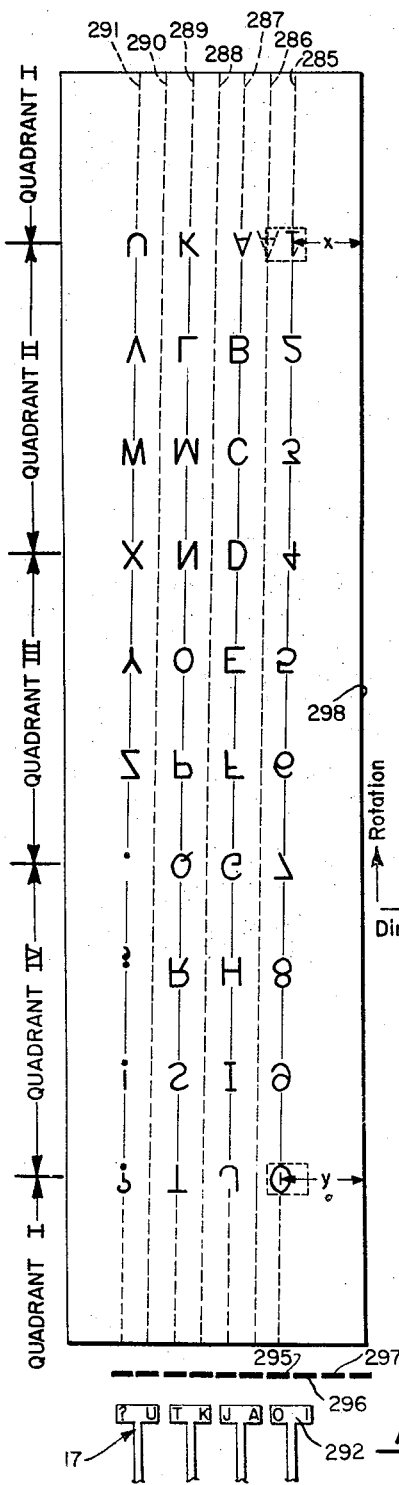
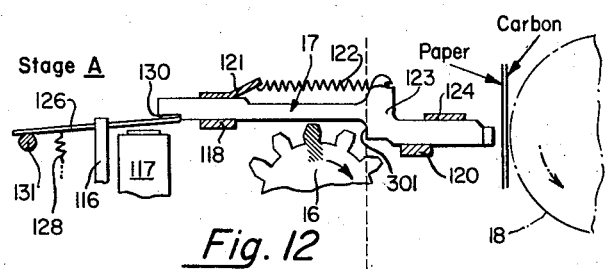
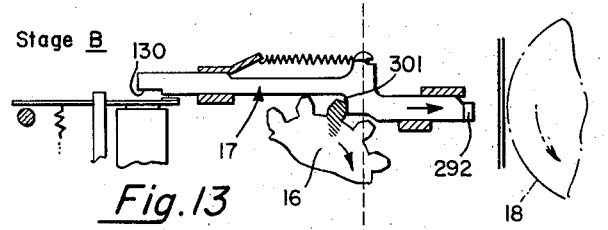
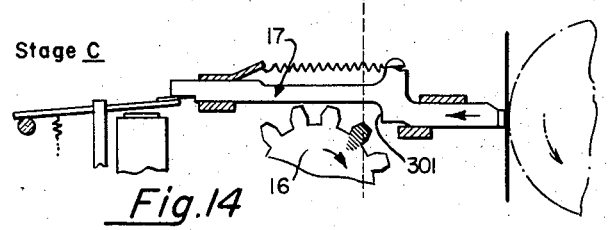
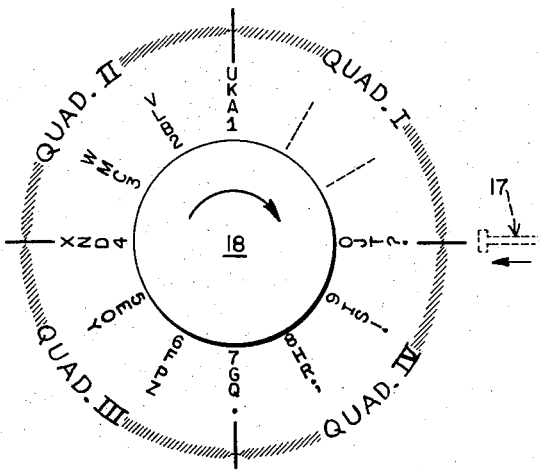
INVENTORS.
PAUL R. HOFFMAN
HARLEY E. KELCHNER
FRANK H. MOORE, JR.
EDWIN A. FRICKE, JR.
BY William R. Nolte
AGENT Aug. 23, 1960
P. R. HOFFMAN ET AL
2,949,846
PRINTING MECHANISM
Filed March 28, 1958
17 Sheets-Sheet 10
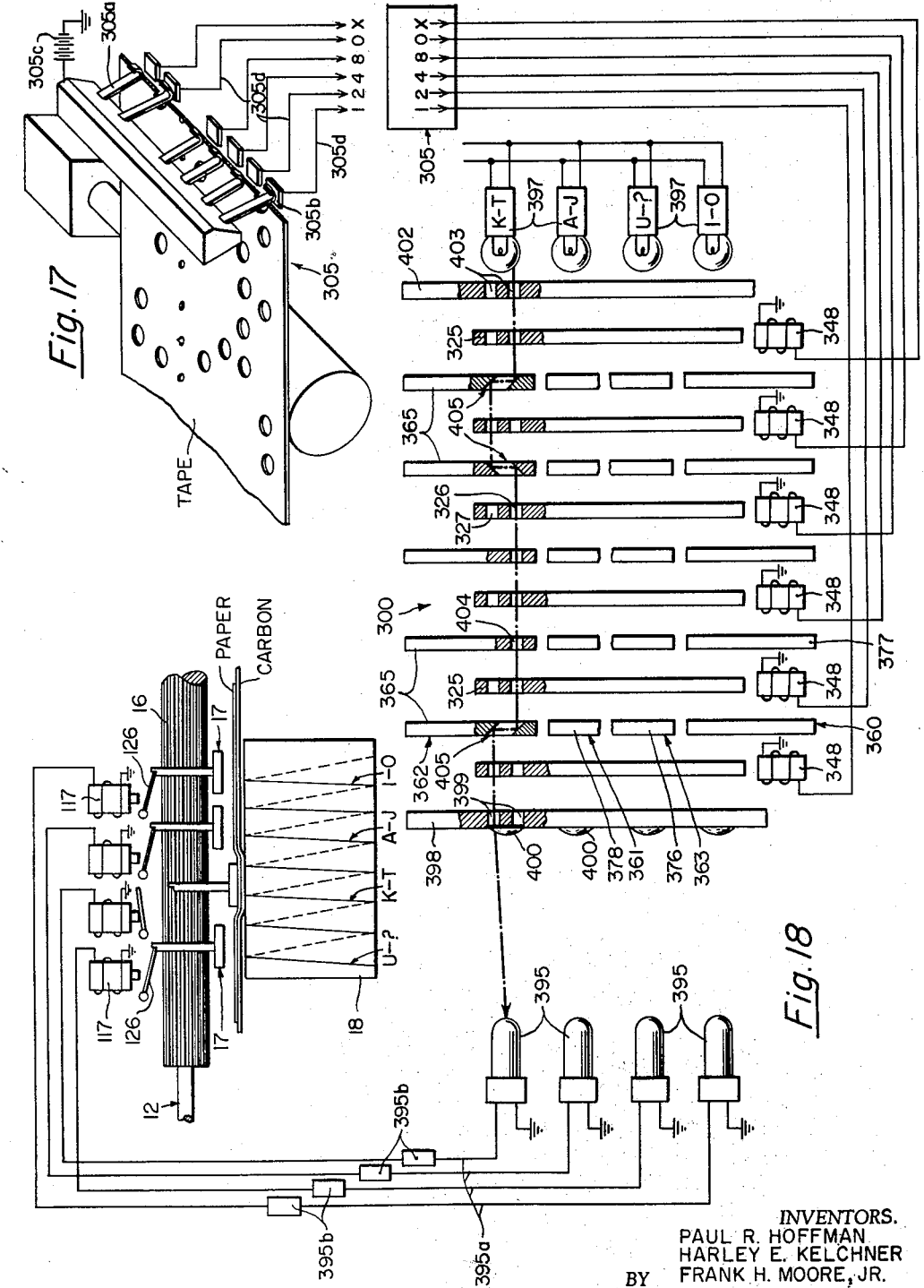
INVENTORS.
PAUL R. HOFFMAN
HARLEY E. KELCHNER
FRANK H. MOORE, JR.
EDWIN A. FRICKE, JR.
BY
William R. Nolte
AGENT Aug. 23, 1960   P. R. HOFFMAN ET AL   2,949,846
PRINTING MECHANISM
Filed March 28, 1958   17 Sheets-Sheet 11
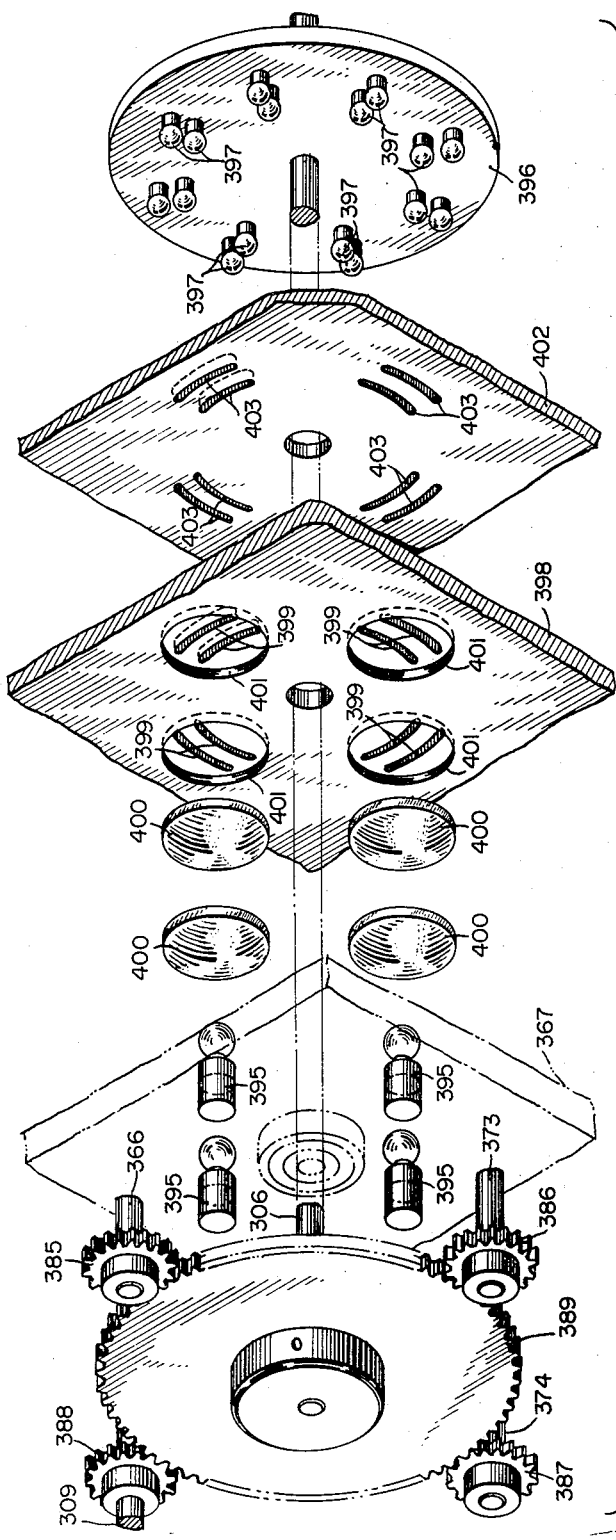
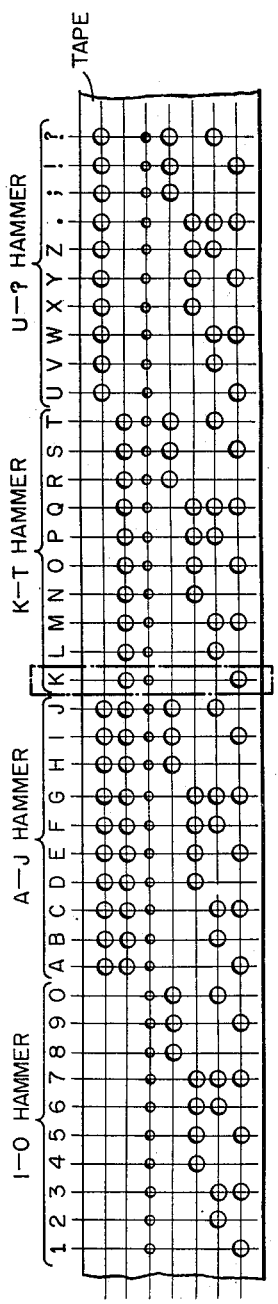
INVENTORS.
PAUL R. HOFFMAN
HARLEY E. KELCHNER
BY FRANK H. MOORE, JR.
EDWIN A. FRICKE, JR.
William R. Nolte
AGENT

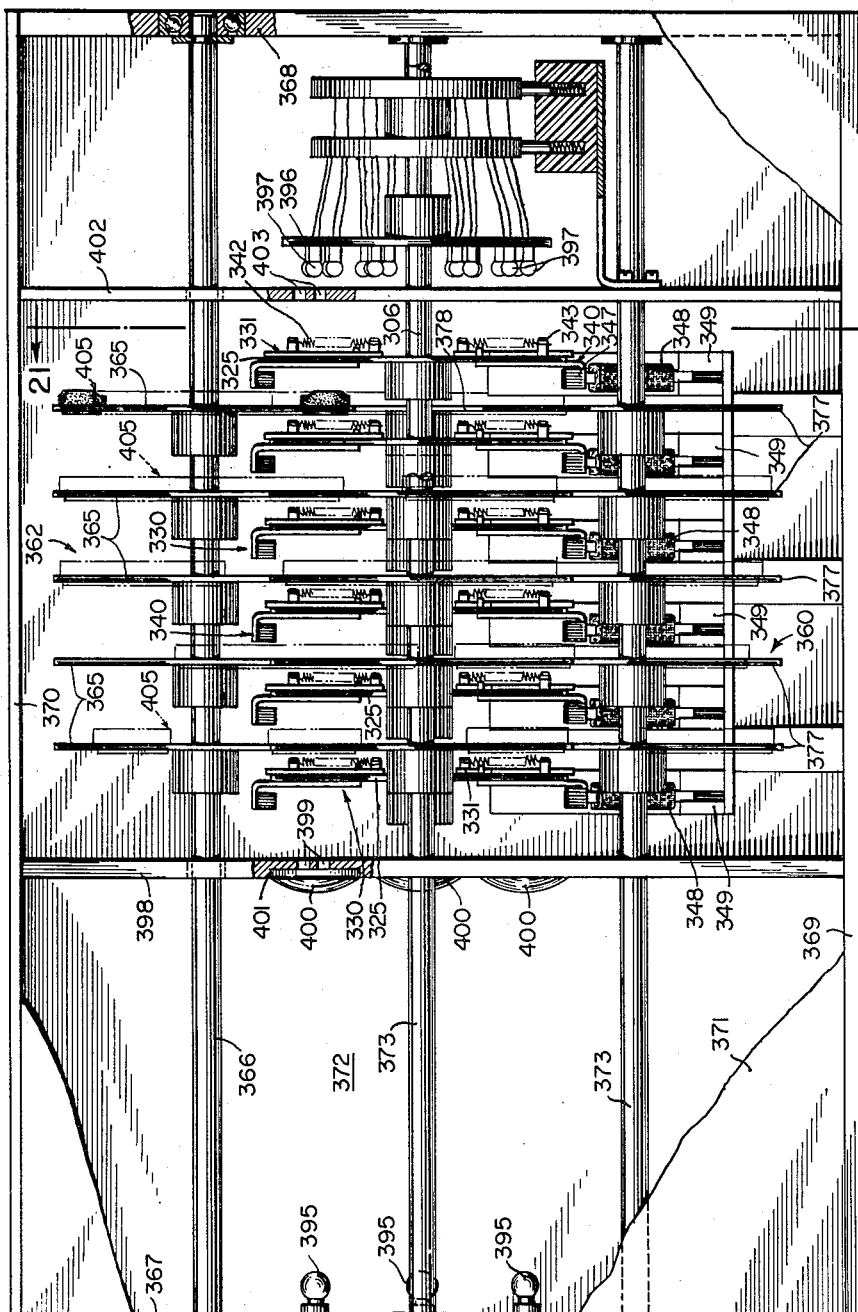

Aug. 23, 1960 P. R. HOFFMAN ET AL 2,949,846
PRINTING MECHANISM
Filed March 28, 1958 17 Sheets-Sheet 13

INVENTORS
PAUL R. HOFFMAN
HARLEY E. KELCHNER
BY FRANK H. MOORE, JR.
EDWIN A. FRICKE, JR.

William R. Nolte
AGENT

Aug. 23, 1960    P. R. HOFFMAN ET AL    2,949,846
PRINTING MECHANISM
Filed March 28, 1958    17 Sheets-Sheet 14

INVENTORS.
PAUL R. HOFFMAN
HARLEY E. KELCHNER
FRANK H. MOORE, JR.
EDWIN A. FRICKE, JR.
BY William R. Nolte
AGENT Aug. 23, 1960 P. R. HOFFMAN ET AL 2,949,846
PRINTING MECHANISM
Filed March 28, 1958 17 Sheets-Sheet 15
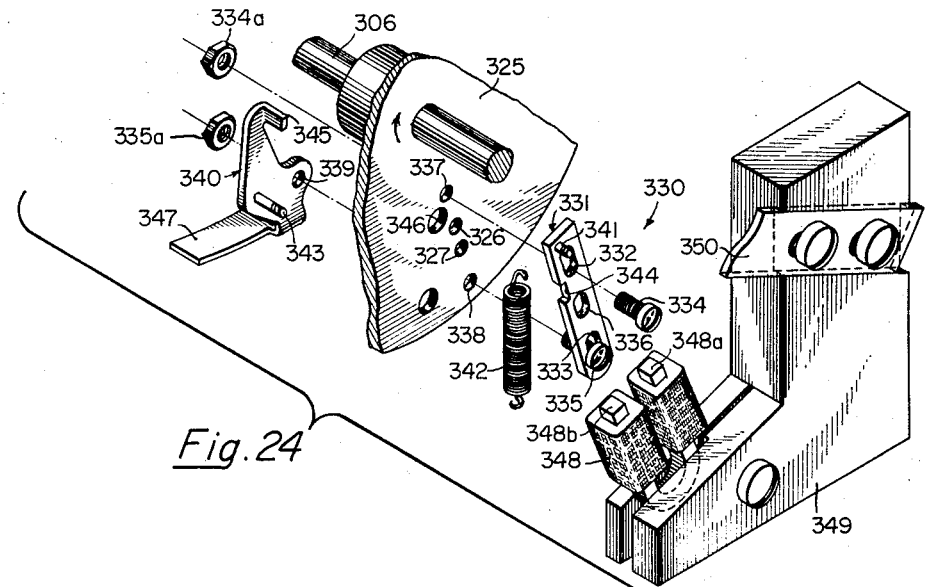
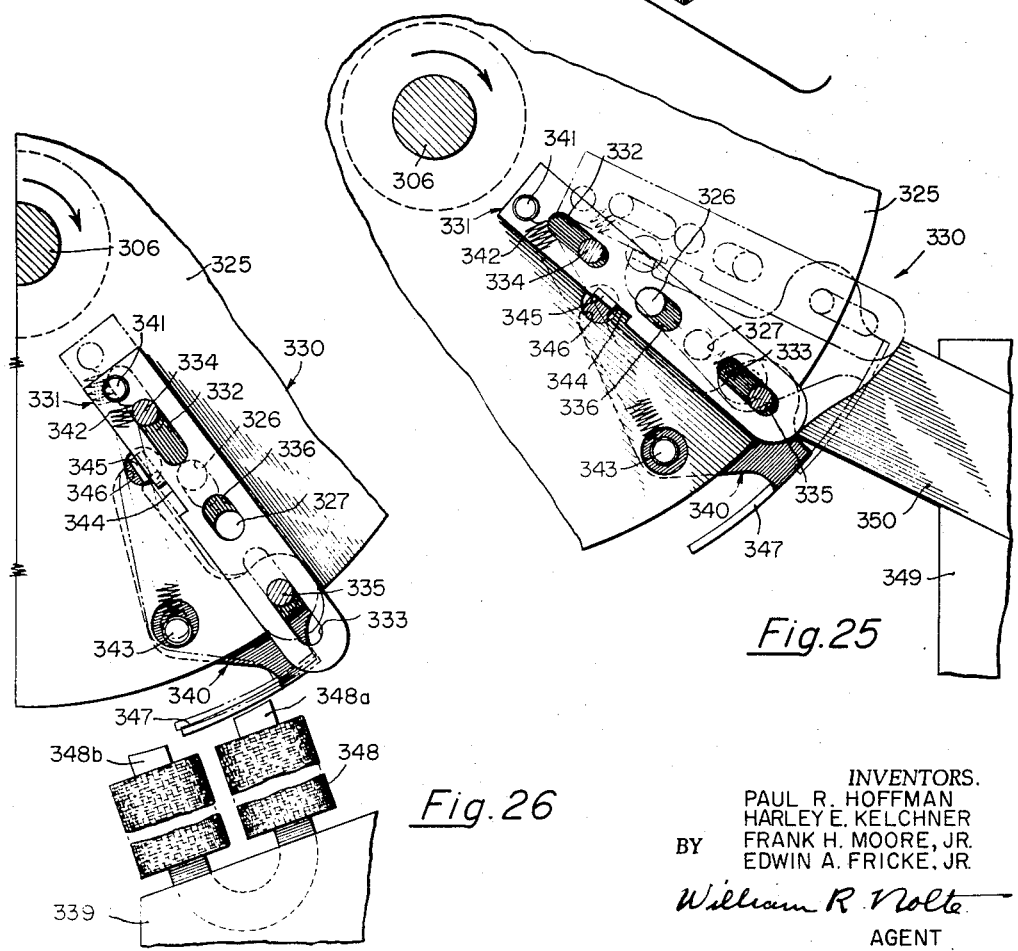
INVENTORS.
PAUL R. HOFFMAN
HARLEY E. KELCHNER
BY FRANK H. MOORE, JR.
EDWIN A. FRICKE, JR.
William R. Nolte
AGENT Aug. 23, 1960  P. R. HOFFMAN ET AL  2,949,846
PRINTING MECHANISM
Filed March 28, 1958  17 Sheets-Sheet 16

INVENTORS.
PAUL R. HOFFMAN
HARLEY E. KELCHNER
BY FRANK H. MOORE, JR.
EDWIN A. FRICKE, JR.

William R. Nolte
AGENT

United States Patent Office 2,949,846
Patented Aug. 23, 1960

2,949,846

PRINTING MECHANISM

Paul R. Hoffman, Woodlyn, Harley E. Kelchner, Wayne, Frank H. Moore, Jr., King of Prussia, and Edwin A. Fricke, Jr., Philadelphia, Pa., assignors to Burroughs Corporation, Detroit, Mich., a corporation of Michigan Filed Mar. 28, 1958, Ser. No. 724,655

20 Claims. (Cl. 101—93)

This invention relates generally to printers. More particularly however it has to do with electromechanical printers.

A principal object of this invention is to provide a printer of improved and simplified design and operation.

An important object of the invention is to provide an improved control means for the printer.

Another object of the present invention is to provide a printer of improved design embodying subcombinations of mechanisms which are easily detachable from the complete machine and replaceable whereby repairs, adjustments and maintenance may be quickly and easily effected.

Another object of this invention is to provide a printer embodying a minimum number of parts which are rugged yet easily and inexpensively manufactured.

An additional object of the invention is to provide printing apparatus wherein the insertion of a record medium is facilitated.

Still another object of the invention is to provide an electromechanical printer wherein printing elements are mechanically energized to print on a record medium in response to an electrical signal.

A further object is to provide improved type carrying means in the form of a drum having type characters arranged over its surface in a helical path.

A preferred form of the invention includes a type drum provided with characters disposed over its surface in a multiturn helical path. The type drum is rotated about its axis while being moved laterally along said axis. Operatively coupled to the type drum is a carriage containing a plurality of printing hammers. Associated with each hammer is a magnet which, when selectively pulsed, withdraws a latch releasing the hammer to be moved by spring force in a direction away from the type drum until a projection on the hammer contacts a tooth of a gear-like member rotating in synchronism with the type drum. Upon contact with the gear-like member the hammer is impelled in the opposite direction to strike a paper and ribbon and move them against the desired character on the type drum as the latter rotates the characters into printing position, thus to print the character at the desired location on the paper. The force of the printing stroke causes the hammer to rebound away from the type drum aided by the spring. However, during the printing stroke of the hammer the latch is restored to its latching condition and intercepts the hammer on its rebound before it contacts the toothed shaft, thus to prevent an undesirable printing stroke. As the type drum moves along its axis, characters are successively printed across the paper in a line. At the completion of each line the drum and hammers are returned at high speed to start the next line of printing as the paper is moved to present the next line.

Further details and other objects of the invention will be more apparent from the following detailed description of the invention when taken in conjunction with the accompanying drawings in which:

Fig. 1 is a plan view of the printing device;

Fig. 2 is a partial front elevational view taken along the line 2—2 of Fig. 1, showing the left portion of the printing device;

Fig. 2A is a partial front elevation view showing a frame plate connected to the left side plate of the carriage;

Fig. 2B is a section of view taken along the line 2B—2B of Fig. 2A showing the relationship between the type drum bar and the frame plate;

Fig. 2C is a fragmentary plan view illustrating the end connection between the type drum bar and the frame plate;

Figs. 2D and 2E are successive sectional views taken along lines 2D—2D and 2E—2E of Fig. 2A to further illustrate details of the type drum shaft;

Fig. 3 is a partial elevational view of the device taken along the line 3—3 of Fig. 1;

Fig. 4 is a fragmentary perspective view showing the vertical gear-train hinge which permits opening and closing of the carriage;

Fig. 7 is a sectional view through the type drum and hammer carriage taken along the line 7—7 of Fig. 2;

Fig. 7A is a view taken along line 7A—7A of Fig. 7 to illustrate the driver gear;

Fig. 8 is a view taken along the line 8—8 of Fig. 7 and with parts removed to further illustrate the hammer carriage;

Fig. 9 is a view taken along the line 9—9 of Fig. 7 to illustrate one position of the mechanism for advancing the type drum laterally along its axis;

Fig. 10 is a view similar to Fig. 9 but showing another position of the mechanism;

Figs. 12, 13 and 14 are views showing the successive stages of action by which the hammer is impelled to accomplish a printing operation;

Fig. 15 is a schematic endwise view of the type drum illustrating the disposition of the type characters about the periphery of the type drum;

Fig. 16 is a developed view of the type drum shown in Fig. 15 illustrating the disposition of the groups of type thereon, and their positions relative to the hammers;

Fig. 17 is a view showing a source of information which can be read into the shift register and decoder in the form of electrical pulses, and which takes the form of a tape reading device;

Fig. 18 is a schematic view showing the mechanical-optical shift register and decoder with electrical read-in from the tape-reading device of Fig. 17 and electrical read-out of signals to the printer;

Fig. 19 (on sheet with Fig. 23) illustrates a form of binary coded tape which may be used by the tape-reading device;

Fig. 20 is a front elevational view of the mechanical-optical shift register and decoder;

Fig. 23 is an exploded perspective view of the light source, lenses and photo cell pick-up units of the shift register and decoder;

Fig. 24 is a fragmentary exploded perspective view of a typical light shutter assembly and associated reset means;

Fig. 25 is a fragmentary view which illustrates the reset operation of the light shutter assembly;

Fig. 26 is a view similar to Fig. 25 but showing the tripped condition of the light shutter;

Figure 11:
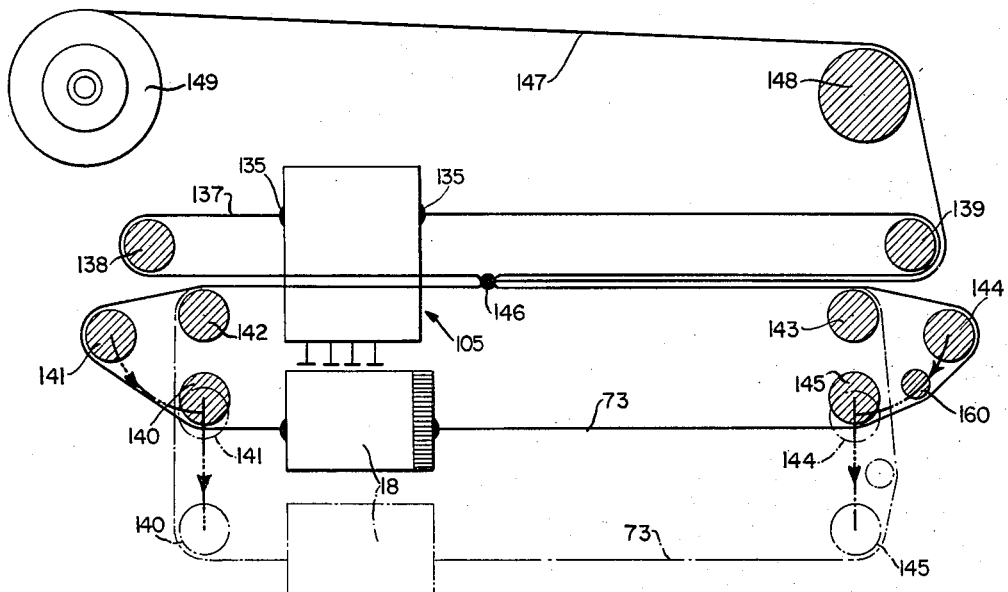
Fig. 11 is a diagrammatic view illustrating the manner by which the hammer carriage is moved synchronously with the type drum.

The subject matter of this invention relates to apparatus of the type described and claimed in the copending application for patents of McDonald et al., entitled "Automatic Printer," Serial No. 660,318, filed May 20, 1957, and assigned to the same assignee as the present application.

Referring now to the various figures of the drawings for the detailed description of the illustrated embodiment of the invention, and first to Figs. 1 and 3 thereof, it will be seen that power for performing the various functions and operations of the printer is supplied to pulley 10 by means of belt 11, the latter being connected to a motor, not shown, but which is continuously rotating when the mechanism is operating. Pulley 10 is fixed to shaft 12 which is journalled for rotation adjacent its ends in standards 13, 13a and 14, which are mounted vertically upon a plate 15. The shaft has an intermediate portion which is fluted or toothed as seen at 16 (see also Fig. 7), and operates to impel printing hammers 17 toward a type drum 18, as seen in Figs. 12 through 14, and in a manner to be later described.

The type drum 18 (Figs. 1, 2 and 3) is mounted for to-and-fro lateral movement on round bar 19, which is parallel to shaft 12. The type drum and round bar are further mounted for movement together in a direction perpendicular to the fluted shaft 12. The latter movement is for the purpose of readily permitting the insertion and removal of the printing record medium, shown and identified as paper in Fig. 14. The type drum 18 and round bar or rod 19 are mounted in a carriage 20 (Fig. 1), which includes a pair of upright side plates 21 and 22 maintained in spaced parallel relation by a bar 23 and a transverse carriage frame plate 24 extending across the machine. The frame plate 24 lies beneath rod 19 in Fig. 1, and the type drum as seen in Figs. 2 and 3.

The left portion 25 of the frame plate 24 is shown fastened (Figs. 2A and 2B) to carriage plate 21 by screws 25a. The left end portion of rod 19 has its end slotted at 19a and is suitably pinned or otherwise fastened to plate portion 25 (Fig. 2B) by pin 19b. The opposite, or right end portion 26 of frame plate 24 is fastened to carriage side plate 22 in a manner similar to that shown in Figs. 2A, 2B and 2C and the right end portion of rod 19 is fastened to portion 26 of plate 24 in the same fashion.

Figure 6:
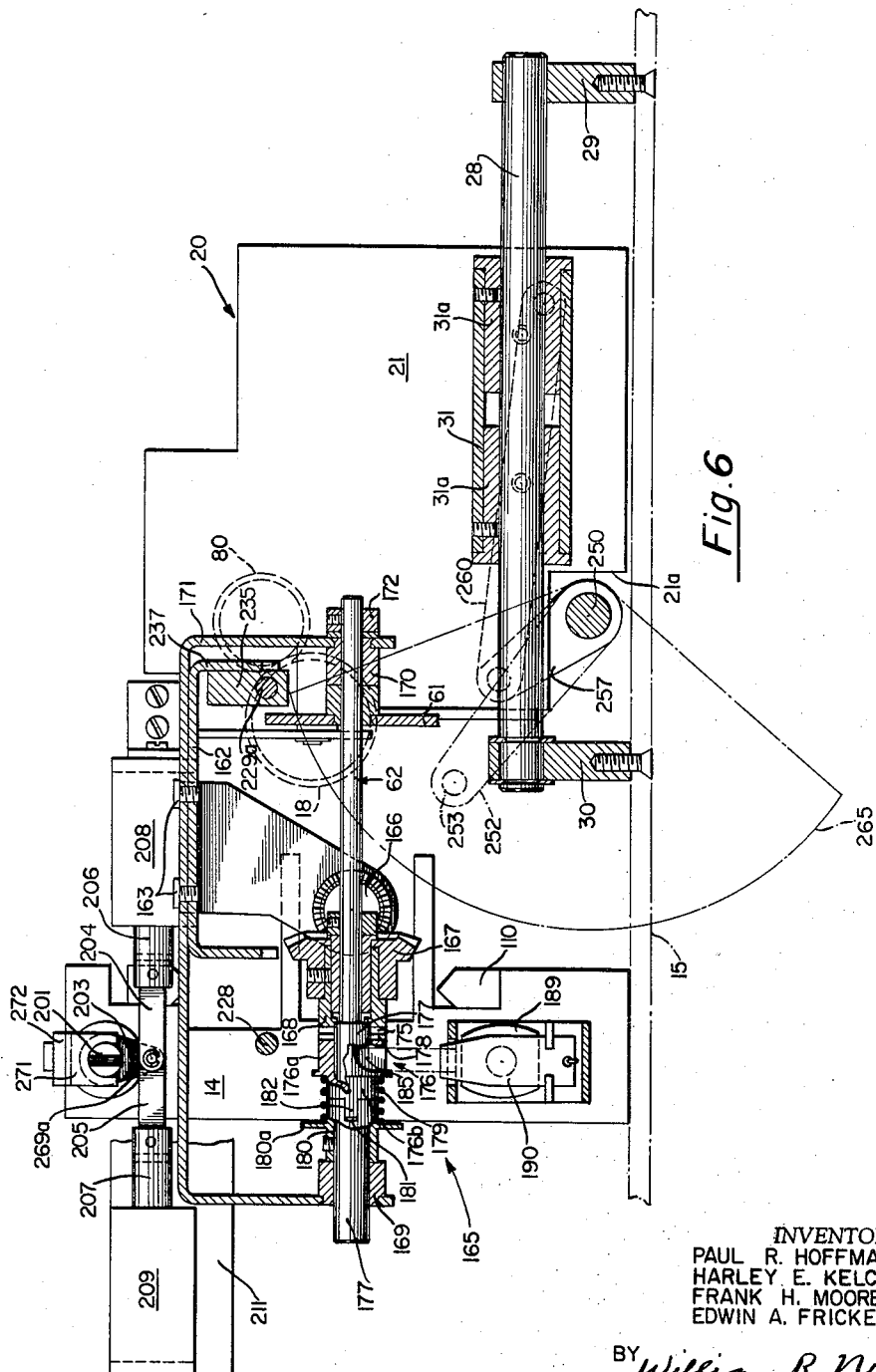
Fig. 6 is a sectional view taken on the line 6—6 of Fig. 1 and shows the portion of the clutch for retraction of the rack about which the type drum is driven, and further shows the sliding bearing support for the left portion of the carriage.

Referring now to Figs. 1 and 6, a guide 28 in the form of a round bar or rod is mounted above and in spaced relation to base plate 15 by means of a pair of blocks 29, 30. An elongated bushing 31 containing bearings 31a suitably mounted to carriage side plate 21 permits the left end of the carriage to slide on the guide 28. The right hand carriage plate 22 is provided with a pair of rollers 32 and 33 which engage and ride on a guide 34. The latter may be in rectangular bar form and suitably fixed to base plate 15. By means, later to be described, the type drum carriage may be moved toward and away from the printing hammers.

Type drum 18 is mounted for rotation about rod 19, see Figs. 9 and 10, also Figs. 2D and 2E. The diameter of the bar 19 is substantially the same as the diameter of the bore of the type drum which is internally threaded as indicated at 38. The underside of rod 19 includes a keyway, or slot 39, which extends the length of the bar. A transverse rack 40 is positioned in the keyway and is mounted for limited movement radially of the rod. The lower edge of the rack includes teeth 41 which mesh with the internal threads 38 of the type drum when the rack 40 is in its lowered position, as seen in Fig. 9.

Rotation of the type drum when so engaged with the rack will cause the drum to advance across the machine from left to right, as seen in this figure. When, however, as seen in Fig. 10 the rack is raised to its retracted position inside of rod 19, thus disengaging the rack teeth 41 from drum teeth 38, the drum is free to be quickly returned to its initial starting position for printing a new line of copy, as hereinafter described.

Still referring to Figs. 9 and 10, it will be seen that a parallelogram linkage 42 is provided for effecting the aforementioned radial movement of rack 40 relative to rod 19. Two pairs of riser links 43 and 44 are pivotally secured at their toe portions by pivots 45 and 46 to the aforementioned portions 25 and 26a respectively of transverse frame carriage plate 24. The pairs of riser links 43 and 44 are additionally pivoted as at 52 and 53 to downwardly projecting ears 54 and 55 of transverse rack 40. The links pass through pairs of elongated slots 56 and 57 cut through type drum shaft 19, see Figs. 2A, 2D, and 2E are of sufficient length to permit pivotal movement of the links. A top crossbar 58, disposed in parallel relation to a line containing pivots 52 and 53 is pivotally connected at each of its ends to the top extremities of links 43 and 44, as at 59 and 60 respectively.

Means for moving the parallelogram linkage is provided by an eccentric cam 61 mounted on shaft 62. The cam engages a roller 63 mounted upon the lower end of a lever 64 to rotate the latter about its pivot 65. The upper end of lever 64 is pivotally connected at its left end by pin 67 to a connecting rod 66, the other end of which is pivotally connected by pin 68 to the pair of links 43 beneath pin 59. It can thus be seen in Fig. 9 that when the cam is rotated so that roller 63 is urged into engagement with its low side, as by spring 63a, the riser links are pivoted by the aforedescribed linkage in a clockwise direction to lower the rack into engagement with the internal threads of the type drum. Upon rotation of cam 61 to the position shown in Fig. 10 the high side of the cam is presented and a counterclockwise rotation is imparted to the riser links withdrawing the threads on the rack from engagement with the internal threads of the type drum.

As seen in Fig. 2E a slot 69 is cut into the top portion of the transverse type drum shaft 19, and provides a keyway for receiving a key 70, the center portion of which is encircled by the type drum. Enlarged end portions of the key have mounted thereon short posts 71 and 72, to which are tied or otherwise fixed the ends of a tape 73, the reason for which is explained hereinafter. A roller 74 mounted upon a post 75 also secured to the right hand end of key 70 engages the right side face of the type drum and eliminates excessive frictional contact of the type drum with key 70 as the type drum moves to the right when rotating.

The type drum is rotated by a gear 76 rigidly fixed to the right hand side of the drum and a driver gear 80 mounted on a drive shaft 81, suitably journalled for rotation in side plates 21 and 22 of carriage 20, see Figs. 1 and 2. Driver gear 80 is keyed to shaft 81 by means of key 82 received in keyway 83 of the shaft, see Figs. 7 and 7A, whereby the driver gear may slide along its shaft yet remain in mesh with gear 76 fixed to the type drum, as the latter moves along its shaft in either direction.

Referring to Figs. 1 and 4, rotation of shaft 81 is obtained by means of the gear train 96. Gear 87, pinned, or otherwise fixed to actuator shaft 12, meshes with and drives gear 88 similarly fastened to idler shaft 89 which is journalled for free rotation in standard 13. Gear 90 fixed to the opposite end of the idler shaft meshes with and transmits power to idler gear 91 mounted on shaft 12. Idler gear 91 is mounted on shaft 12 so that it can rotate freely about the shaft, and drives gears 92 and 93 rotatably mounted between a pair of links 94 suitably maintained in spaced parallel relationship and constituting a first gear train linkage 95. Power from linkage 95 is transmitted to a second gear train linkage 96, hinged to train 95 about the axis of rotation of gear 93, and includes a second pair of links 97 between which gears 93, 98 and 99 are rotatably mounted. Gear 99 is affixed to and drives shaft 81 thus effecting rotation of driver gear 80 and type drum 18, Fig. 1. It can readily be appreciated that when the type drum carriage is moved to its open position the pairs of links 94 and 97, embracing gear trains 95 and 96, will pivot relative to each other without disengagement of the gears.

Associated with the type drum is a hammer carriage 105 (Figs. 7 and 8) which includes top and bottom identical elongated members or castings 106, angle-shaped in cross-section. A pair of spaced rollers 107 (Fig. 8) are mounted on one arm of the angle and a single roller 108 on the other arm intermediate rollers 107. The rollers are seen in Fig. 7 in engagement with the upper and lower V-faced ways 109 and 110. The roller carrying members 106 are carried by a pair of side plates 111, 112, to which they are suitably secured as by tongues 113, thus to maintain members 106 in spaced vertical arrangement for rolling engagement along the V-faced ways 109 and 110. As seen in Fig. 7 the plates are suitably cut away to partially surround the actuator shaft 16. A back plate 114, Fig. 7, is fastened by flanges 115 to the side plates 111 and 112. By means of brackets 116, a plurality of magnets 117, corresponding in number, in this instance 4, to the number of printing hammers 17, are mounted in spaced relationship to the back plate 114. The hammers 17 are mounted for straight line sliding movement toward and away from type drum 18 by means of comb-like blocks 118 and 119, the latter being suitably fastened between the side plates 111 and 112. As seen in Fig. 8, the blocks are slotted as at 120 and serve to guide the hammers in spaced parallel motion. A cover plate 121 is secured to the top portion of block 118 to keep the hammers in slots 120. The plate also serves to anchor one end of each of a plurality of springs 122, the other end of each spring being connected to an ear 123 of a printing hammer. Suitably secured across the top of the other block 119 is a plate 124 which cooperates with plate 121 to maintain the movement of the hammers in a straight line.

A shroud 125 is fixed between and over the outer ends of side plates 111 and 112, as seen in Fig. 7 to protect the ends of the hammers from foreign matter. When the hammers are actuated they are projected through apertures 125a in the outer vertical surface of the shroud. As seen in Figs. 12, 13 and 14 the record medium is fed through the space between the hammer ends and the type drum and the shroud 125 (Fig. 7) and guides the paper and ribbon between the hammer carriage and the type drum. The aforementioned brackets 116 also serve as pivotal mountings for clappers 126 of solenoids 117 as seen at 127. A spring 128 is attached at one end to each clapper 126 and at its other end to a fixed bracket 129. The spring force normally urges one end of each clapper into engagement with a notch 130 on its associated type hammer 17, thus to lock the hammers in their retracted or inoperative positions. Transverse pins 131 which extend between plates 111 and 112 limit the pivotal movement of the clappers to their hammer latching position which position provides the correct gap or spacing between the clappers and their associated magnets.

Referring now to Fig. 8, a pair of clevis elements 135 are shown adjustably attached to side plates 111 and 112 of the hammer carriage 105 by means of nuts 136. By varying the position of the nuts on the threaded portion of the clevis, the position of the hammer carriage may be adjusted relative to the type drum, as will be more fully described hereinafter.

Referring now to Figs. 8 and 11, a flexible steel tape 137 is shown connected at its ends to opposite sides of the aforementioned hammer carriage 105 from which it extends around pulleys 138 and 139. The previously mentioned tape 73, connected at its ends to posts 71 and 72 on key 70, see Fig. 9, extends around pulleys 140, 141, 142, 143, 144 and 145. Both tapes 137 and 73 are soldered or suitably joined at a fixed point as indicated at 146. A third tape 147 of similar construction has one end connected at 146 to the other tapes and extends around pulleys 139, 148 to terminate on a retractable spring driven pulley 149. All of the tapes are of a flexible material and readily conform to the peripheries of the aforementioned pulleys. The retractable pulley 149 is in the nature of a spring drum which tends to wind the tape 147 thereabout, and accordingly resiliently bias both the type hammer carriage and the type drum to their left hand positions. The pulley 149 is effective simultaneously to return the hammer carriage and the type drum to their leftmost positions for the beginning of a new line of printing whenever the type drum has been disengaged by the aforementioned retractable rack 40, Fig. 10. The advancement of the type drum from its left hand position to the right is accomplished as before mentioned by power supplied to the rotating gear 76 on the type drum. Because the hammer and type drum are interconnected by means of the flexible tapes 73 and 137 they advance to the right concomitantly through each printing or word space signal. For reasons of clarity, the tapes have not been shown on certain of the other figures, such as Figs. 1, 2 and 3, where they would normally appear.

Figure 5:
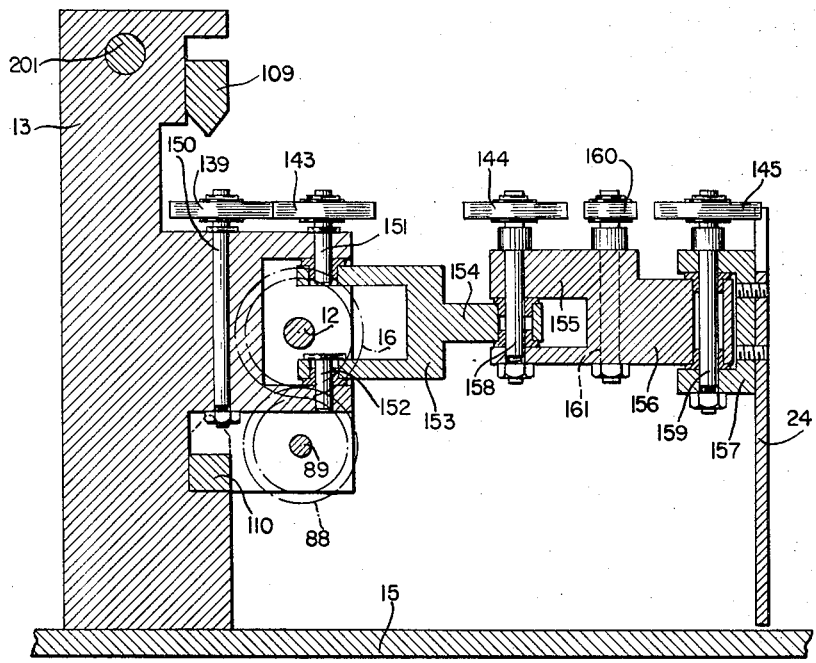
Fig. 5 (on sheet with Fig. 11), is a sectional view taken on the line 5—5 of Fig. 1 and shows a horizontal hinge which permits opening of the carriage.

As viewed in Figs. 1, 5 and 11, pulleys 139 and 143 are mounted in stationary standard 13, pulleys 139 and 143 being mounted for rotation about pins 150 and 151 respectively. A second pin 152 is in alignment with pin 151 and together they serve to mount a U-shaped hinge element 153 for rotation relative to standard 13. Pivotally connected at one end to hinge element 153 by pin 158 and tongue portion 154 is the mating hinge element 155, which is pivotally connected by pin 159 to a U-shaped block 157 fixed to carriage frame plate 24. Pulley 144 is also mounted on pivot pin 158 at its outer end.

Pin 159 also serves to support pulley 145 for its rotational movement. A supplementary tension pulley 160 is mounted in hinge element 155 by means of pin 161, and may be suitably adjusted to vary the tension of resilient tape 73 in a manner not shown herein.

With reference to Fig. 1 it will be seen that pulleys 140, 141 and 142, as well as pulley 138 is mounted by a similar hinge structure as that shown in Fig. 5, but extending in the opposite direction. As viewed in Fig. 11 the hinge structure, as described, permits the configuration of resilient tape 73 to assume that which is shown in phantom line position. In this latter position it is apparent that the type drum, by virtue of its mounting in the type drum carriage 20 can be moved away from the hammer carriage to permit insertion in the machine of a record medium. It should be further apparent that the relationship, and more particularly the lateral position and rotation of the type drum on its shaft, is in no way affected when the type drum carriage is in its open or closed position. Thus the phasing of the type drum relative to the hammer carriage cannot be affected by the hinge mechanism hereinbefore described.

It will be recalled, with reference to the above descriptions of Figs. 9 and 10, that operation of type drum 18 upon its shaft 19 is controlled by rotation of cam 61. It will be understood that the type drum can be stopped anywhere along the length of shaft 19 by disengagement of toothed rack 40 merely by the rotation of cam 61. Intermittent rotation of cam 61 to operate the rack 40, as described, is controlled by means of a clutch 165, best seen in Figs. 2 and 6.

Referring first to Fig. 2, it is seen that actuator shaft 16 has keyed to its left end a bevel gear 166 which meshes with a second bevel gear 167, the latter in turn being pinned or otherwise fixed to the clutch drive part 168 (Fig. 6). The gear 167 and clutch drive part 168 are rotatably mounted on shaft 62 and are arranged to be continuously driven by bevel gear 166, from the constantly rotating actuator shaft 16. As seen in Fig. 6, shaft 62 is mounted in end bearings 169 and 170, fixed in the arms of U-shaped bracket 171, the latter being suitably fixed to base plate 15 by means of a downwardly extending flange 171a (Fig. 2). Secured to the underside of U-shaped bracket 171 as by screws 163, is a second smaller U-shaped bracket 162, the purpose of the latter is to be hereinafter described. As seen in Fig. 2, brackets 162 and 171 are supported in elevated position relative to base plate 15 by means of a pair of posts 164, only one of which is shown. The end face of the clutch drive part 168 is formed with clutch teeth 175.

For transmitting motion of drive member 168 to shaft 62, the other or driven clutch part 176 comprises cylindrical member which is linearly slidable on an enlarged portion 177 of shaft 62. The right end face of member 176 is adjacent to the toothed left end face of clutch part 168 and is provided with teeth 178 adapted when moved to the right to engage teeth 175 and thereby transmit motion from the drive part 168 to the driven part 176. Member 176 has a length 176b of reduced diameter extending into a coil spring 179 which is held under compression between the enlarged end of the member 176a and a flange 180a formed as an integral part of a bushing 180. Bushing 180 is pinned or otherwise made fast to the shaft portion 177 to transmit rotation of the clutch driven member 176 to the driven shaft 62, through the medium of transverse square slots 181 diametrically disposed in the end of bushing 180 and telescopingly receiving similarly diametrically disposed square lugs 182 projecting from the adjacent end 176b of the clutch member 176. The overall length of the driven clutch member 176 is such as to permit declutching of the parts when member 176 is shifted endwise, compressing spring 28 and without disengaging lugs 182 from slots 181.

To perform this declutching operation the periphery of member 176 is formed with two quadrant-like cams 185 disposed one hundred and eighty degrees apart to ride successively into the path of a clutch-shifting dog 186 (Fig. 2) which is pivotally mounted by pin 187 to the bracket 171 to swing toward and away from the periphery of member 176. The upper free end of dog 186 has an arcuate cam 186a so that when in the path of either of cams 185 the member 176 will be forced linearly to the left, as seen in Fig. 6, along shaft portion 177 compressing spring 179, and removing teeth 178 from engagement with teeth 175, thus to stop rotation of shaft 177. The dog 186 is normally biased to declutching position by a stretched tension spring 188 (Fig. 2) but is shifted to clutching position by the energizing of a magnet 189 through clapper 190 when it is desired to drive shaft 62. The magnet 189 is energized through electrical circuitry, as described later, for timed operation of the printer as will be understood.

When the magnet 189 is energized its clapper 190 is drawn into engagement with the hooked end of dog 186 thus to rock the dog out of the path of cams 185, whereupon the compression spring 179, Fig. 6, shifts the clutch member 176 to the right to engage the two sets of clutch teeth 178, 175 and cause member 176 to be rotated. Rotation of member 176 is transmitted to bushing 180 and from it to the driven shaft 62. This driving of the shaft is timed to comprise only a half revolution of shaft 62 alternately to present high and low sides of cam 61 (Figs. 9 and 10) to its associated linkage which will respectively raise and lower rack 40 for disengagement and engagement with the type drum 18.

To retain hammer carriage 105 (Figs. 7 and 8) in position opposite a given character position on the page when a stop signal is received by the printer, as described later, ratchet means 194 is provided. A channel member 195 is fixed to the top of the hammer carriage by downwardly depending legs 196 and 197 which are secured to side plates 111 and 112 respectively. A pawl 198 is rotatably pinned to a pair of ears 199 turned up from the top wall of channel member 195. A spring 200 having its ends respectively secured to the aforementioned ears and to the pawl biases the pawl upwardly in a clockwise direction to retain the same in engagement with teeth 202 on the underside of bar 201, thus to restrain the hammer carriage against movement in a leftward direction. It will be recalled with reference to Fig. 11 that the hammer carriage is constantly urged in a leftward direction by the steel tapes 137 and 147 as urged by the spring driven drum 149.

As described above, when rack 40 is engaging the type drum 18, as seen in Fig. 9, and the drum is rotating, it will traverse the carriage from left to right while printing a line of characters on the record medium, as more fully described below. Under certain conditions, however, before it completes a line of printing it may be necessary to stop the drum by retracting rack 40, as seen in Fig. 10. The drum then may be returned to its starting position at the left side of the carriage, or started again substantially at the position in which it was stopped thus to complete the line it was printing when stopped. Retraction of rack 40 to stop the drum is effected by pulsing solenoid 189 to engage the clutch elements 168 and 176 thereby rotating cam 61 to raise rack 40 to the position shown in Fig. 10. If at this time it is desired to return the drum and hammer to their starting position at the left hand side of the carriage, rod 201 is rotated, as described below, thus releasing stop pawl 198. As soon as the pawl is released spring reel 149, through tapes 147, 73 and 137 moves the printing elements to the left, as seen in Fig. 11, until stopped in their starting position.

Referring now to Fig. 1, and also to Fig. 6, it is observed that the aforementioned ratchet bar 201 is suitably mounted along its length between upright standards 13 and 14 for pivotal and axial movement therein. The left end portion of bar 201 has mounted thereon a bushing 269 and is connected thereto by means of a pin-slot connection. A pin 270 is carried by the bushing diametrically thereof and is received in elongated slot 268 of shaft 201. Crank arm 269a, Fig. 6, affixed to bushing 269 extends downwardly and is pivotally connected to a pair of tie links 204 and 205 connected at their other ends respectively to solenoid plungers 206 and 207 of solenoids 208 and 209. The solenoids 208 and 209 are supported by means of plates 210 and 211 fixed to the upright standard 214. Turning now to Fig. 2, plate 272 and U-shaped member 271 which embraces bushing 269 prevent leftward movement of the bushing when axial movement is imparted to ratchet shaft 201.

When it is desired to permit the type drum and the hammer carriage to be returned to their initial starting position for the printing out of a new line of type, as mentioned above, ratchet bar 201 is rotated through a given angle by means of solenoid 209, plunger 207 and the aforementioned pin slot connection. Rotation of bar 201 moves its teeth 202 out of engagement with the pawl 198, and the hammer carriage 105 is thus free to be returned leftwardly by the aforementioned resilient tape system. To commence a new line of printing the transverse type drum rack 40 is re-engaged and at the same time by means of electrical circuitry not described, the corresponding solenoid 208 is energized which retracts solenoid plunger 206 and through tie link 204 returns the ratchet bar 201 to its normal position. At this time the pawl 198 is re-engaged with the teeth 202 and the hammer carriage and type drum may now be driven rightwardly to perform their printing function.

If it is desired to complete the line of printing already started rather than start a new line, it should be understood that it may be necessary to back up the drum and hammer to position them for printing the next character. For example, the last character printed may have been a "Z" which is almost the last character on the left of the drum, see Fig. 16. Now suppose the next character to be printed is an "A." But this character has already passed the next character printing position because it is on the extreme right side of the drum. Therefore the printing elements—type drum and hammers—must somehow be returned to the left to print the "A."

While it may not always be necessary to back up these elements to print the next character it happens with such frequency that provision has been made to automatically back them up each time they are stopped before reaching the end of the printing line. With reference to Figs. 1, 2 and 6, it will be seen that this is accomplished by the aforementioned pin-slot connection. The pin 270, carried by bushing 269 and the slot 268 within rod 201, permits leftward axial movement of rod 201. A compression spring 273 encircles the shaft between standard 14 and a flange on shaft section 201f and normally urges the rod 201 to the right.

Understanding that the spring force of drum 149, Fig. 11, is greater than spring 273, it will also be understood that when rack 40 is retracted (Fig. 10), the pull of tape 147 will overcome spring 273 and move the printing assembly to the left a predetermined distance.

This distance may be determined in several different ways. For example, the end of ratchet bar 201 may contain a shoulder 201s which can be spaced from standard 14 a distance equalling the desired movement. When the shoulder contacts the standard the printing drum and hammers have moved the desired distance to set them for printing any desired character after the last printed character. On the other hand, as seen in Figs. 1 and 3, the movement of rod 201 may be controlled by the distance of nut 274 at the right hand end of rod 201 from standard 13, which movement, of course, is adjustable by turning the nut in either direction. The normal position of rod 201 is determined by the abutment of nuts 275 against the opposite side of standard 13, also adjustable.

To insure a smooth return of the type drum and hammer carriage to the initial line starting position an air cushion mechanism identified by reference character 215 is provided, see Figs. 1 and 2. It consists of a cylinder 216 fixed to bracket 217 by bushing 218 and nut 219, and a piston 220 mounted on the end of a rod 221 for axial movement within the cylinder. A plunger 223 is axially aligned with, and fixed to, rod 221 and extends through an aperture 222 in the cylinder and bushing 218. The plunger 223 has an enlarged end portion 224 which likewise moves along the length of bore 222 in a manner which will be hereafter described. Coil spring 224a encircles plunger 223 between piston 220 and the leftward wall or bottom of cylinder 216 to urge the piston rightwardly.

Referring now to Fig. 1 an equalizing linkage 225 is provided to transmit the impact forces from the type drum 18 and the hammer carriage 105 to the previously mentioned air cushion mechanism 215. The linkage includes an equalization beam 226 which is in the nature of a singletree and is pivoted on piston rod 221 midway along its length as at 227. A pair of rods 228 and 229 respectively are aligned parallel to the axis of piston rod 221 and are secured at their left ends to the extremities of the equalizing beam 226. Rod 229 is in two parts and comprises a first length 229a, and a second length 229b, the latter being carried by the type drum carriage 20, see Fig. 2.

The aforementioned rod portion 229a, Fig. 6, is shown supported by means of block 235 which is fixed to depending arm 237 of bracket 162. The block 235 supporting rod length 229a, Fig. 2, is shown as having a pair of spaced downwardly depending extensions 238 and 239 suitably bored to support the rod 229b for axial movement. In a similar manner the rod length 229a is supported for movement along its length by means of a block 240 which is suitably fixed to the left side 25 of the type drum carriage frame plate 24 at its end portion 25. Rod 229 is broken into two parts, 229a and 229b, to permit the opening and closing of the carriage and at the same time to permit the air cushion mechanism 215 to function when the type drum carriage is in its closed position. The impact force transmitted by the type drum is along a line of action which coincides with the axes of the two rod lengths 229a and 229b. The right end portions 228c and 229c of rods 228 and 229 are positioned in the path of movement of the aforementioned hammer carriage and type drum. Thus upon quick return of the hammer carriage and type drum to the left and the subsequent impact with the extremities of the right ends of rods 228 and 229 respectively, the rod 221 operates to force the piston 220, Fig. 2, to the left. Initially the enlarged plunger end 224 is within the bore 222 and the air within the cylinder is compressed. Upon further movement of the piston to the left and the subsequent and further compression of the air within the cylinder the enlarged end portion of the plunger is passed through the bore 222 opening the latter to permit the compressed air to escape. This follows because the diameter of the plunger 223 is less than that of its enlarged end portion 224, consequently a passageway exists between the walls of the bore 222 and the reduced diameter of the plunger 223. It can readily be seen by virtue of this mechanism that the initial impact forces resulting from the impact of the type drum and the hammer carriage with the rods 228 and 229 is absorbed by the initial compression of the air within the cylinder. When a certain build-up of pressure has occurred the inner end of plunger 224 will be withdrawn from bore 222 permitting the compressed air to rapidly be expelled from the cylinder. This mechanism prevents a bouncing or recoil of both the type drum and hammer carriage.

To facilitate the insertion and replenishing of the paper and ribbon supply within the machine the type drum carriage may be opened by the following described apparatus: it is observed that with reference to Figs. 1, 2 and 3 that a shaft 250 is mounted for rotation in blocks 251, Fig. 2, 251a, Fig. 3, fixed to case plate 15. The shaft extends through cutout 21a, Fig. 6, in carriage side plate 21, and further extends beyond plate 21 to the far leftward portion of the machine where is passes through block 251, Fig. 2. The left hand end of shaft 250 is provided with a crank compression arm 252 and a handle 253. The arm is locked in the armature 256 of a solenoid 255 when the carriage is closed but the operator may release the latch by energizing solenoid 255. Shaft 250 may then be rotated in a clockwise direction to open the carriage 20. Two arms 257 and 258, as seen in Figs. 1 and 6, are spaced on shaft 250 just within the upright side plates 21 and 22 of the type drum carriage 20. A pair of links 260 and 261 are pivotally attached at one end to the ends of arms 257 and 258 respectively, and at their other ends to side plates 21 and 22. Shown in phantom in Fig. 6 when shaft 250 and arms 257 and 258 are rotated in a clockwise direction by the crank, links 260 and 261 are moved forwardly thus to move the type drum carriage 20 away from the hammer carriage 105.

When the type drum carriage is moved away from the hammer carriage it is necessary to disable the air cushion mechanism 215, Fig. 2, because the coil spring 224a, interposed between piston 220 and the end wall of cylinder 216, normally urges the piston rod 220 and equalizing beam 226 and rods 228 and 229 rightwardly. It will be recalled in addition that rod 229 is in two parts and that consequently if rod length 229a were not arrested in its rightward movement its right end would be in the path of movement of the left end of rod 229b and thus would obstruct the return of the type drum carriage to its closed position.

In order to arrest the rightward movement of the piston and its associated linkage when the carriage 20 is opened a fan-shaped segment 265, Figs. 2 and 6, is fixed to shaft 250 to the left of side plate 21. When shaft 250 is rotated in a clockwise direction, as previously described, the periphery of fan-shaped segment 265 engages a grooved element 266 fixed to shaft 229a, Fig. 2. The periphery of the segment 265 rides within one of the grooves of the element 266 and restrains the piston rod 221 against axial movement as the carriage is opened. Thus coil spring 224a is prevented from moving piston rod 221 axially to the right. When the fan-shaped element is rotated in a counter clockwise direction it is disengaged from grooved element 266 and the air cushion mechanism once more becomes operative.

The relationship of the type characters and their disposition on the type drum 18 are illustrated in Figs. 15 and 16. Referring first to Fig. 15 it is observed that the characters may be equally spaced around the periphery of the type drum, which for clarity of description is divided into quadrants. The first quadrant is divided into three spaces but contains no active characters therein. The second, third and fourth quadrants together include 10 groups of characters which embrace nine equal angular spaces around the periphery of the type drum. The entire font of characters is divided into four separate groups, as seen in Fig. 16, which illustrates the surface of the type drum if flattened out. The first group is identified as a numeric group constituting the characters from 0 to 9 inclusive. The second group constitutes a first portion of the alphabet and includes the letters A to J inclusive. The third group includes the portion of the alphabet made up of the letters K to T inclusive, while the fourth group is made up of the remaining letters of the alphabet U to Z inclusive, and a number of punctuation marks. The entire font of characters is disposed in alternate turns of a multiturn helical path around the external surface of the drum 18. The aforementioned first group of characters identified as 0 to 9 is disposed within a first turn 285 of the multiturn helix. The second group of characters, identified as A to J inclusive, are contained in a third turn of the multiturn helix 287. The second turn 286 and all alternate turns of the helix are blank for the reason described below. The third set of characters, K to T inclusive, is placed in the fifth turn 289 of the helix with an intervening blank or fourth turn 288, while the last group of characters is disposed in the seventh turn 291 of the helix adjacent to the intervening blank sixth turn 290.

Associated with the four groups of characters, as seen in Fig. 16, are four hammers disposed adjacent the active or character-containing turns of the helix. It should further be understood with reference to Fig. 16, taken in conjunction with Figs. 9 and 10, that the internal threads 38 on the type drum 18 are of the same lead and hand as the helical turns in which the characters contained on the outside of the type drum. Adjacent hammers, as seen at the bottom of Fig. 16, are located two pitch distances apart with reference to the helix formed by the type characters and also with reference to the internal threads of the type drum. The pitch of the helix referred to in both instances above further defines and is related to the spacing of the printed characters on a line of type across the page of a record medium which has been printed upon. With the above arrangement one revolution of the type drum will advance a given character one character space across the record medium and because the hammers are locked for lateral movement with the type drum each hammer will correspondingly be advanced one pitch distance or character space.

The hammers are aligned across the type drum and the characters in each type group are also aligned on the type drum, for example, the "4," "D," "N" and "X" are on the same line, see Figs. 15 and 16, therefore it is apparent that if desired any number of the hammers may be fired simultaneously.

As the characters of any given group each have a distinct and different lateral placement along the helix of the type drum it, of necessity, follows that the striking face of a given hammer must be wider than a given type character to take care of the aforementioned displacement. Therefore, each hammer is provided with a head portion 292 of sufficient width to strike any of the characters in the helical character group with which it is associated. Thus with reference to Fig. 16 it is seen that the "1" character is nearest to the right hand edge 298 of the type drum 18—as indicated by the distance X—whereas the "0" in the same group of type is displaced a distance "Y" which, because of the pitch of the helix, is greater than the X distance.

It follows therefore, that the "0," for instance, will be struck by the left face portion of the hammer head 292, whereas the "1" will be struck by the right face portion of the hammer head. The remaining characters "2" to "9" inclusive, of that group, will be struck by the intermediate face portions of the same hammer.

In order to avoid double printing the multiturn helix includes a blank, or dead, turn between each active turn of the type characters. The reason for this dead turn arises as follows: if the A to J group of characters were moved to the right, for instance, to occupy the second turn of the helix line referred to by reference character 286, the "A," for example, would be in the position shown in phantom on line 286. The "0" to "1" hammer, being at least two characters wide, would therefore extend into the space or would intersect the character "A" shown in phantom, and consequently the hammer would not only print the "1" by impact with its right hand portion but it would in addition strike a portion of the "A" if so positioned. This undesirable situation is avoided by providing a blank or inactive turn between each active turn of characters making up the helix.

In the form of the invention presently described, it has been found desirable to leave one quadrant of the type drum vacant. This is seen in Fig. 15 where it is observed that the first quadrant (quad. 1) includes no type characters while the remaining 270° including the second third and fourth quadrants include equally spaced type face demarcations.

The aforementioned vacant spaces provided in the first quadrant permit resetting of the type hammer 17. Note in Fig. 15 that with respect to the first group of type the "0" is shown in printing position with respect to the hammer 17, and that the character "1" is 270° or three quadrants distance "in advance" of hammer 17, that is, only 90° from the next printing space of a character. As seen in Fig. 16 the respective print positions on the page, identified as 295 and 297, are shown in progression in the direction of axial movement of the type drum indicated by the large arrow to the right of the type drum 18. The most stringent requirement, timewise, occurs when, for example, it is desired to print the "0" which is the last character in the "1" to "0" group at the print position 295 and to subsequently print the first character in that same group, namely the "1," in the subsequent printing position 296. In this situation it will be apparent that the turn of the helix containing the first group of type has been rotated such that three-fourths of that turn of the helix has passed before the print hammer corresponding to print position 295 and that a further turn of 90° would present the "1" of that group to the next advanced printing position 296 on the paper. Thus if it is desired to print at two successive positions on the page the character "0" and then a "1" it follows that after having printed the "0" in the first position the same hammer must be latched and fired to print a "1" during the time that the type drum rotates through only 90°. Leaving the first quadrant vacant provides sufficient time for the hammer to be prepared to print the first character in the succeeding printing space after the last character of that group has been printed and after only 90° rotation of the drum. Thereafter printing of successive characters in a group necessitates 390° rotation of the drum. For example, to print "12" the "1" is printed on the drum and must rotate a full revolution (360°) to place the "1" in the next printing space, and then 30° more to register the "2" with that space.

A further concept in connection with Fig. 16 arises when, for example, it is desired to print a "Z" in the character position 295 on the record medium. It can be appreciated that the "Z" is contained in the seventh helical turn identified by reference character 291. Upon completion of the helical turn 285 carrying the first, or numerical group of type, the type drum in addition must be rotated six additional turns before the "Z" is presented to the character position 295 on the page. Hence the signal which accomplishes the firing of the type hammer 17 to print the "Z" in the character position 295 must be stored for seven cycles of rotation of the type drum. By the same token if the "Z" were to be printed out, for example, in the character positions which precede the 295 position the storage required would be a lesser amount, as seen in Fig. 16.

With reference to Figs. 12, 13 and 14 the various phases of movement of the hammers 17 with respect to the actuator shaft 16 are set forth. It should be recalled that hammer actuator shaft 16 and the type drum 18 are synchronously driven. More specifically, a given tooth on the actuator shaft may correspond to a given type character on the type drum 18, that is, the shaded tooth shown in stage A of Fig. 17 may correspond to the line of type characters "2," "B," "L" and "V" (Fig. 16). It will be further noted that the type hammers 17 are mounted perpendicular to the horizontal axis of type drum 18.

Printing is effected by energizing the magnets 117, and the signals obtained by a mechanical-optical shift register and decoder 300, Fig. 1, which will now be described in more detail. When magnet 117 receives an electrical signal it operates to withdraw the end of the clapper from the notch 130 of hammer 17 (Fig. 12, stage A). Spring 122 moves the hammer leftwardly into the path of the rotating tooth of actuator shaft 16. With further reference to stage A of Fig. 17 it is observed that at the instant the signal is received the shaded tooth selected to make contact with hammer 17 is shown in an approximately vertical position. As the spring 122 moves the hammer to the left (Fig. 13, stage B) the shaded tooth has rotated in a clockwise direction to make contact with the heel 301 of the hammer. At this instant the direction of motion of the hammer 17 is reversed and it is now impelled forwardly by the shaded tooth in a rightward direction. The hammer pushes the paper and type ribbon or carbon against the appropriate character on the type drum as it rotates into printing position (Fig. 14, stage C). After impact the hammer will rebound and return rearward again and is further aided by the tension spring 122. Complete rearward travel and subsequent contact with the toothed shaft is prevented by the clapper which is returned to its latched position and arrests the movement of the hammer. It is thus seen that hammer 17 is linearly actuated and impelled against the selected type as the latter reaches the printing position, and the timing of the hammer movement and the arrival of a selected type face at printing position is positively synchronized to the actual contact point.

*Mechanical-optical shift register and decoder*

The mechanical-optical shift register and decoder, now to be described as illustrated in Figs. 17 to 30, inclusive, is also described and claimed in the copending application for patent of Paul R. Hoffman, entitled Storage, Interpreting and Printing Machine, Serial No. 731,714, filed April 29, 1958, and assigned to the same assignee as the present application.

The aforementioned mechanical-optical shift register and decoder 300 performs two functions for the printer. The first is a shift register function which provides a temporary storage of data until the printer is ready to use it. The second function is that of a decoding nature such that it translates or interprets from a binary code to one intelligible to the printer, namely, to an alphanumeric form. Schematically this can be followed by directing attention to Figs. 17 and 18. In the upper right hand corner thereof is shown a source of information in the form of a punched tape reading device 305. The code of the tape may, for example, be a six-channel binary code, illustrated in detail in Fig. 19 (on sheet with Fig. 23). The code appearing in perforated form on the tape is translated above the tape in alphanumeric form opposite the perforations.

Referring back to Fig. 18, the tape is shown as being read by the tape-reading apparatus 305, and the information so read is conveyed in the form of electrical signals to the aforementioned mechanical-optical shift register and decoder 300. The information received by the latter is temporarily stored and translated from the aforementioned binary code into intelligible data and then electrically read into the printer.

As will be recalled, particularly with reference to Fig. 16, the characters on the type drum of the printer are divided into four groups. With reference to Fig. 19 the characters contained on the type drum may be related to the first two channels, namely, the "X" and the "0" channels identified at the left of the binary coded tape. Thus, for example, when the first two channels of the tape, the "X" and the "0" channels are perforated this indicates that the characters "A" to "J" on the type wheel are to be selected. If neither the "X" or the "0" channels contain perforations the "1" to "0" numerical characters on the type drum will be actuated. In a similar manner if only the "X" channel contains perforations then the "U" to "Z" and punctuation characters on the type drum will be selected, while if the "0" channel of the tape and not the "X" channel is perforated the characters from the "K" to "T" group will be selected. Thus it may be summarized that the first two channels of the tape are used to indicate which groups of characters are to be selected.

The remaining four channels of the tape, namely the 8, 4, 2 and 1 channels, indicate which particular character in a given group is to be actuated. Note that the four groups of coding identified by the numerals 1 to 0, A to J, etc., have successively identical perforations in the aforementioned four remaining channels on the tape. It should be observed that this is consistent with the placement of the characters in line about the periphery of the type drum. Put another way, it will be observed in Fig. 15 that, for example, in the second quadrant the characters V, L, B and 2 have the same angular disposition about the periphery of the type drum. This identical angular relationship is established in that the same characters at V, L, B and 2 have identical code perforations in 8, 4, 2 and 1 channels of the tape (Fig. 19). Recapitulating, it can be stated that the "X" and "0" channel perforations determine which group of characters is to be selected. The remaining four channels 8, 4, 2 and 1 determine the angular relationship of the characters on the type drum which is to be selected.

With further reference to Fig. 16, it will be recalled that each type group is arranged along alternate turns of a helical path on the outer surface of the print cylinder. This necessitates that the characters on the last turn of the helix 291 must be brought into printing position six cycles, or revolutions, later than the characters on the first helical turn. The present storage and decoder device provides the signals for this latter group at the appropriate time in a manner which will be presently described.

Figure 22:
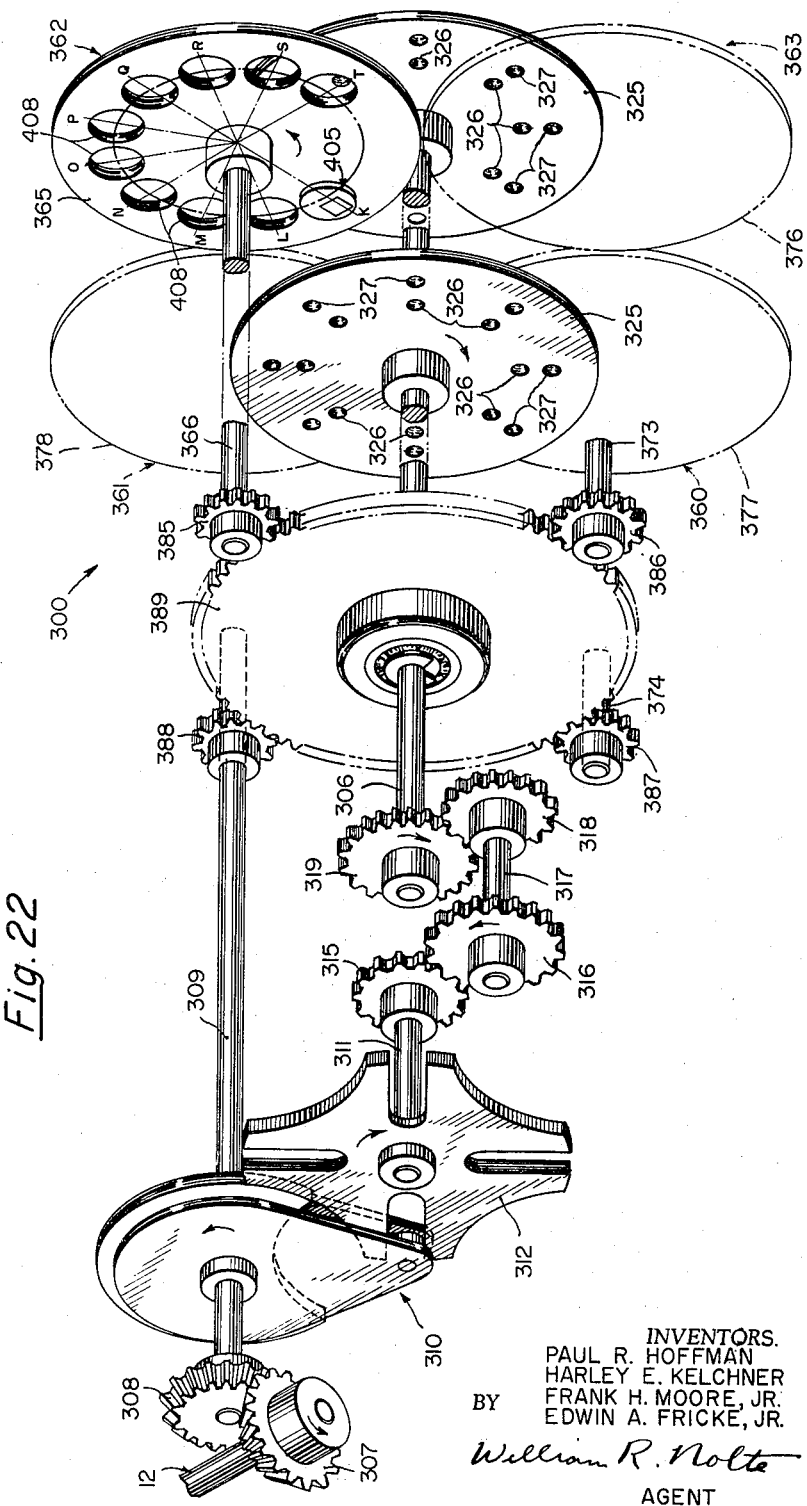
Fig. 22 is a perspective view of intermittently driven gearing associated with the apparatus of Fig. 20.

Referring to Figs. 20 and 22, a central shaft 306 is synchronously driven with the type drum 18 and actuator shaft 12 (see Fig. 1). By means of a bevel gear 307 affixed to shaft 12, and a second bevel gear 308 affixed to shaft 309. An intermittent motion mechanism 310 (Fig. 22) of the well known Geneva gear, transmits intermittent motion to a stub idler shaft 311 by means of slotted plate 312. Gear 315 fixed to the opposite end of shaft 311 meshes with a reducing gear 316 fixed to an idler shaft 317. Gear 318 pinned to the other end of idler shaft 317 meshes with gear 319 pinned to central shaft 306. Gears 315, 316 and 318 and 319 provide a gear reduction, while the Geneva, in addition, provides intermittent motion to them. For each rotation of actuator shaft 12 and corresponding rotation of type drum 18, an intermittent and partial revolution is transmitted to central shaft 306 by the previously described Geneva and gear train reduction. More specifically, the central shaft is rotated one-eighth of a revolution or 45°, with each full revolution of shaft 12 and type drum 18.

On the central shaft 306 (Figs. 20 and 22), are permanently fastened six thin discs 325, only two of which are shown in Fig. 22. These discs correspond to the six channels of the binary tape illustrated in Fig. 19 (refer also to Fig. 30). Each disc may include 16 code holes, eight of the holes 326 are arranged in an inner circle, and the remaining eight holes 327 are arranged in an outer circle in each disc. Pairs comprising one of each group are spaced at equal angles around the circles. Fig. 22 shows portions of two of the six discs 325 while Fig. 20 shows an edgewise view of the six discs. The holes in all six central discs 325 are aligned from disc to disc so that a beam of light can pass through corresponding holes in all of the discs.

Mounted on each disc are eight shutter assemblies 330 (Figs. 24, 25 and 26). Each shutter assembly includes a shutter plate 331 which can be placed in one of two positions on disc 325 such that in one position it covers the inner circle hole 326 or in its other position the outer circle hole 327 (see Fig. 21).

Figure 27:
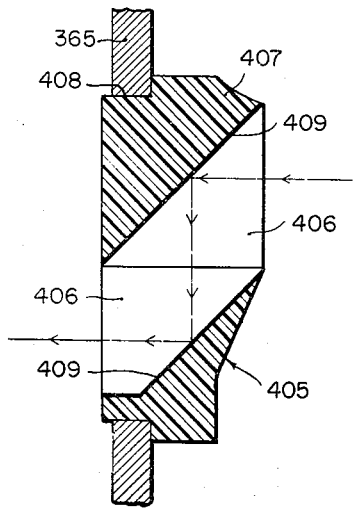
Fig. 27 (on sheet with Fig. 2) is an enlarged cross-sectional view of a typical prism carried by a decoding disc.

The shutter plate 331, as seen in Figs. 25, 26 and 27, has three elongated slots along its length, the two slots on the ends of the shutter are identified as 332 and 333, while the center slot is identified by the reference character 336. Each shutter plate is mounted for radial sliding movement by means of headed screws 334 and 335. The shutter is further mounted relative to the aforementioned holes 326 and 327 such that when the shutter plate is in one radial position the outer circle hole 327 will be exposed through slot 336 in the shutter (Fig. 26), and when in its second position, however, the inner circle hole 326 is exposed (Fig. 25), while the outer hole 327 is closed (Fig. 25).

Referring now to Fig. 24, it will be seen that screws 334 and 335 pass through slots 332 and 333 and through holes 337 and 338 in disc 325. Screw 335 is additionally passed through hole 339 of latching member 340, and both are secured in place by nuts 334a and 335a. The function of the latching member will be discussed more fully later. A pin 341 is fixed to the top or inner end of each shutter plate 331 as seen in Fig. 24, to anchor one end of a tension spring 342 while a corresponding pin 343 on latching member 340 anchors the other end of the spring. The spring performs two functions, on the one hand it applies a force through the pin 341 to urge the shutter element 331 in a radial direction by virtue of the elongated slots 332 and 333, and secondly it applies a torque to rotate the latching member 340 in a clockwise direction as seen in these figures about pivot 335 into latching engagement with shutter 331.

As seen in Fig. 26, shutter plate 331 is notched along its edge as at 344. Latching member 340 includes a hooked arm 345 which passes through hole 346 in disc 325. The diameter of the hole 346 is large enough relative to the size of the hooked arm 345 to permit relative movement of the arm within the hole. The end of arm 345 is received in notch 344 of the shutter plate 331 and operates in this position to lock the shutter plate 331 in its inner radial position exposing the inner circle hole 326.

In order to expose the outer circle hole it is necessary that latching member 340 be disengaged from shutter plate 331 and the latter moved outwardly. For this purpose the latching member is provided with an elongated shoe 347 which extends beyond the periphery of disc 325 but parallels the periphery thereof. The elongated shoe 327 is made up of magnetically attractable material, and its length is such that as it rotates with disc 325 it passes a pair of pole faces 348a and 348b of a horseshoe magnet 348, of which one is provided for each disc. If, during rotation of the disc, the magnet is pulsed, shoe 347 is drawn by the magnetic field into close proximity to the aforementioned pole faces. This movement causes the latching member 340 to rotate about pivot 335 and thus rotates hooked end 345 out of engagement with shutter 331. As seen in Fig. 26 the diameter of the hole 346 is such with respect to the hook 345 that the margins of the hole constitute a stop, and limits the pivotal movement in one direction of the latching member 340. Once the hook 345 has been removed from notch 344 of shutter 331, the tension spring 342 urges the shutter to its outermost radial position exposing the outer circle hole 325 in the disc to permit the passage of light therethrough.

Figure 21:
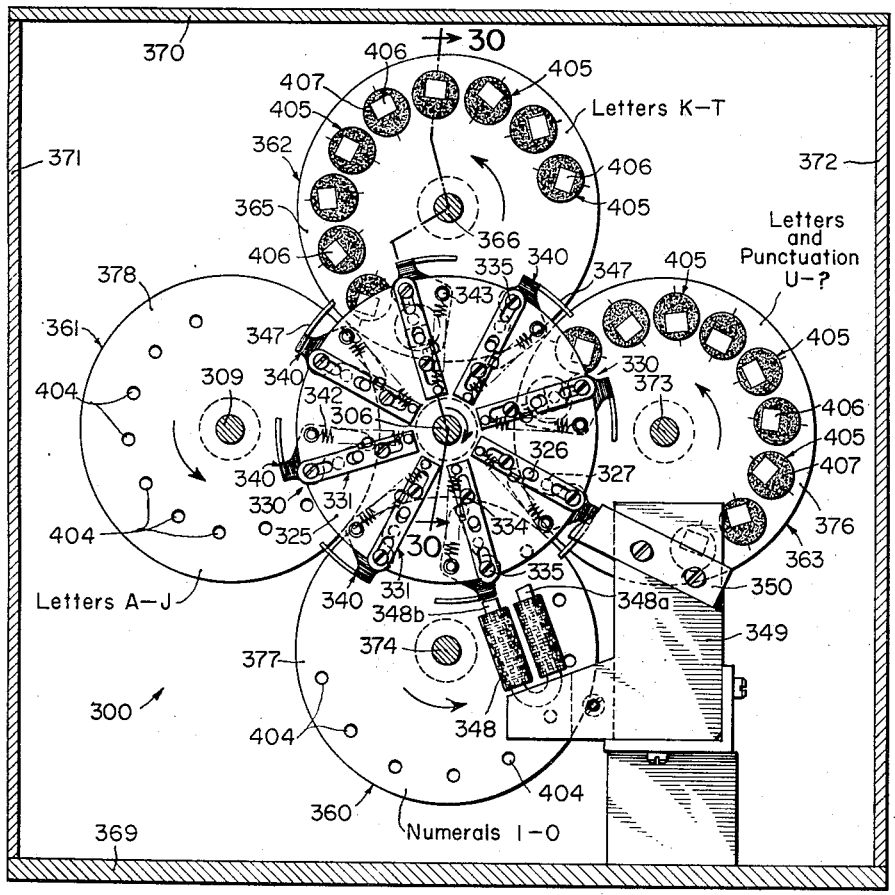
Fig. 21 is a sectional view of the decoder taken along section line 21—21 of Fig. 20.

As seen in Fig. 24, and also in Fig. 20, each magnet 348 is mounted to a stationary base 349. It should be understood at this time that the position of the magnet 348 relative to disc 325 is such that it constitutes the home position at which each of the eight shutters on the central disc are set to cover either an inner circle or an outer circle hole (Fig. 21). The storage function arises by virtue of the rotation of the discs prior to readout or passage of light through the apertures in the six discs. As a given shutter is rotated past the home, or magnet station, the setting which is imparted to the shutter is retained by the shutter throughout the remaining portion of rotation of the disc until such time as the shutter co-acts with a reset cam 350, likewise mounted on stationary base 349. This reset cam 350 erases the setting which was imparted to a given shutter and restores all the shutters which may have been actuated by the magnet. Restoration is effected by moving the shutter radially inwardly so that the inner circle hole on the disc is exposed. As seen in Fig. 26 the lower portion of shutter 331 extends beyond the periphery of disc 325 when the disc has been magnetically operated. Thus upon completing its rotation counter-clockwise to the position shown in phantom in Fig. 25, the lower extremity of the shutter is shown as just making contact with the fixed cam 350. Further clockwise rotation of the disc causes the shutter to ride the cam surface and move inwardly so that the hooked arm 345 of latch 340 can be received in the notch 344, as urged by the spring 342, thus to retain the shutter in its latched position.

From the aforementioned description it can be understood that the magnet 348, when energized, will move whichever shutter is adjacent thereto from its inner position to its outer position thereby to expose the outer hole 327 in the disc upon which the shutter is mounted. Thus each shutter 331 can be set to cover either an inner or an outer hole. Furthermore, a shutter 331 so extended will retain its setting throughout seven cycles of rotation of the aforementioned type drum. It will be recalled at this time that the discs 325 are rotated intermittently one-eighth of a turn or 45° for each full revolution of the type drum, and further since there are seven helical turns on the type drum it may be required to store a signal to print out a given type character for the full seven turns of rotation of the type drum.

Referring now to Figs. 20 and 21, the structure which performs the translating functions (i.e. conversion of binary information 305, Fig. 18, to alphanumeric) of the shift register and decoder 300 will now be described. Inter-leaved between the six central discs 325 are four sets of scanning discs 360, 361, 362 and 363 which are disposed 90° apart in satellite fashion about the periphery of the central discs 325. The first set of scanning discs 360 correspond to the first group of type on the type drum made up of the numerals "0" to "1" inclusive, contained on the helical turn identified by reference character 285 in Fig. 16. The second set of scanning discs 361 correspond to the group of characters on the third turn of the helix, identified by reference character 287, and constituting the first third of the alphabet comprising the letters "A" to "J." The third set of discs 362 correspond to the group of characters "K" to "T" contained in the fifth turn 289 of the helix of the type drum, and the remaining set of discs 363 correspond to the remaining group of letters and symbols contained in the seventh turn of the helix 291 of the type drum.

The set of scanning discs identified by reference character 362 includes five discs 365 fixed to a shaft 366 which is parallel to the central shaft 306. Shaft 366 is mounted for rotation between end plates 367 and 368, the latter projecting upwardly from base plate 369. A top plate 370 and side plates 371 and 372 (Fig. 21) provide a light tight compartment for the mechanism 300. Shafts 373, 374 and 309 (Fig. 21), are likewise mounted for rotation between end plates 367, 368 and each, like shaft 366, have five discs 376, 377 and 378 respectively, fixed for rotation on their respective shafts. It is observed further that the axis of rotation of shafts 366, 373, 374 and 309, and of the central shaft 306, are all parallel. The discs of each of the four sets slightly eclipse the discs mounted on the central shaft and their purpose is to control the passage of light through the inner and outer circle holes 326, 327 of the central discs in a manner to be later described.

The four sets of discs as seen in Fig. 22, rotate synchronously with and at the same speed as actuator shaft 12 and type drum 18. By means of pinion gears 385, 386, 387 and 388, and spur gear 389 (Fig. 22), the latter being mounted to freely turn on central shaft 306, the four scanning shafts 366, 373, 374 and 309 are rotated together and at the same speed. Rotative power received from shaft 12 is transmitted through bevel gears 307 and 308 to shaft 309, thence to pinion gear 388 and through spur gear 389 to pinion gears 385, 386 and 387.

Aligned with the four sets of scanning discs 361, 362 and 363 (Fig. 21), and in line with both circles of holes in the central discs 325 are four photocell pick-up units 395. The photo-cell units 395 may be suitably mounted in side plate 367 at one end of the central shaft 306, see Figs. 20, 23 and 30. Mounted on a plate 396 fixed to the opposite end of shaft 306 are two circles of lamps 397 (Fig. 23). Each circle of lamps coincides in alignment with corresponding inner and outer circles of holes 326, 327 in the central discs 325, see Fig. 30, thus all the holes in the discs 325 have corresponding lamps 397 which rotate therewith. Interposed between the aforementioned photo-cell pickup units 395, and the central discs 325 is a fixed plate 398 which includes four pairs of elongated arcuate slots 399 aligned with the path of rotation of inner and outer circle holes 326 and 327 of the central discs 325. Collecting lenses 400 are mounted in recesses 401 in the face of plate 398 over the pairs of elongated slots 399. A second plate 402 having four pairs of elongated slots 403 aligned with slots 399 in plate 398 is interposed between central discs 325 and the lamps 397. These plates 398 and 402 serve to confine the light emitted from the lamps 398 to a generally straight line.

Figure 30:
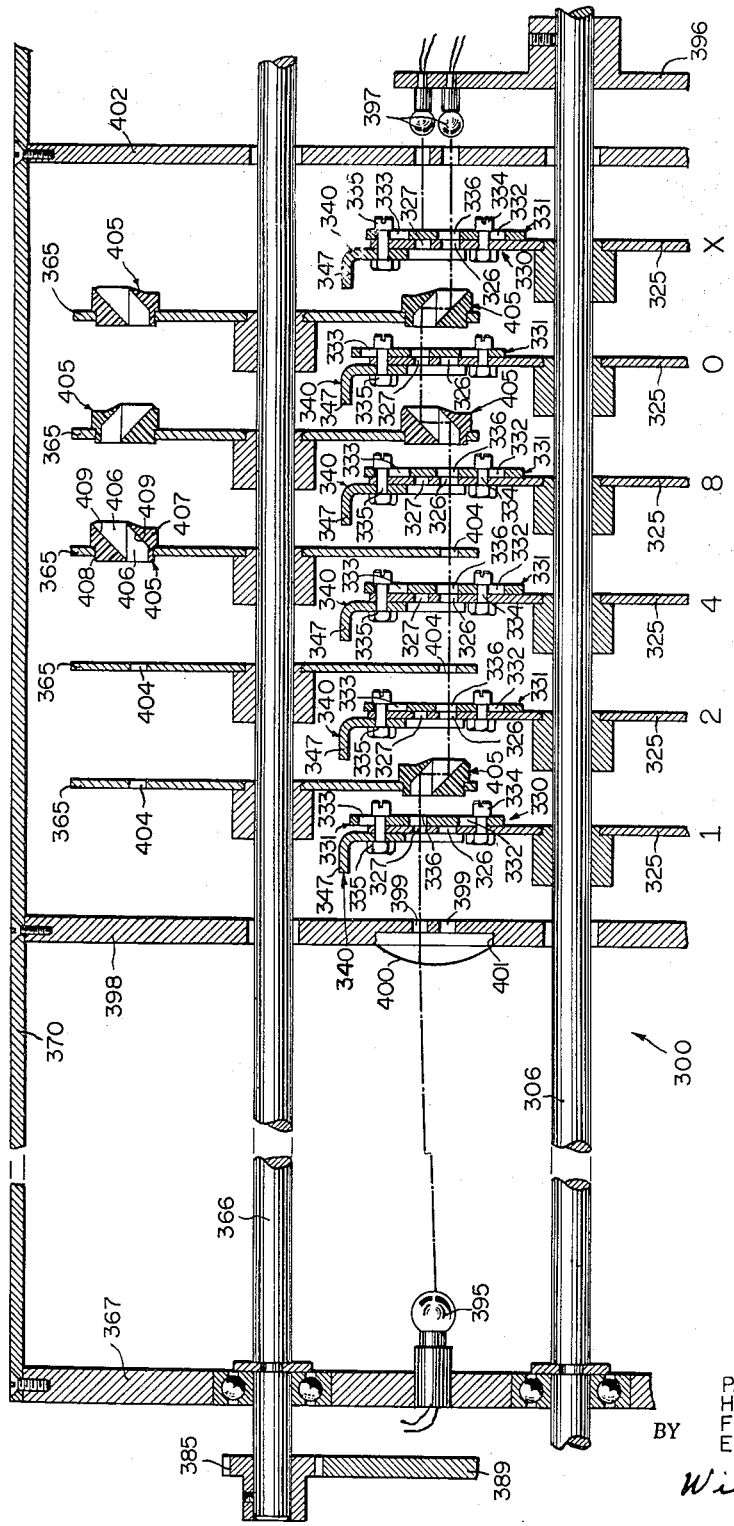
Fig. 30 is a sectional view taken along the line 30—30 of Fig. 21 and illustrates the path of a light beam through the storage discs and associated scanning discs and the pick-up of the beam by a photo-cell unit.

As before mentioned, the four sets of scanning discs 360, 361, 362 and 363 revolve synchronously with the type wheel and at the same speed. Each of the sets of discs contain discs with holes 404, discs with prism units 405, and a disc with holes and prism units. Depending upon the coding selected the discs may present a hole or a prism unit, see Fig. 30, opposite either an inner or an outer circle hole 326 or 327 in the central discs 325. Fig. 27 illustrates one form of prism employed in the device. It comprises a pair of prisms 406 mounted in back-to-back relation which may be bonded in a suitable plastic material 407 and positioned within an enlarged aperture 408 of a disc 365. The geometrical relationship of the prisms 406 is such that light impinging on the hypotenuse, or inclined face 409 of the upper prism, see Fig. 27, is reflected to a corresponding inclined face of the adjacent or lower prism, from which it is reflected out of the prism unit at a lower level. The deflection of the beam corresponds to the radial displacement between the inner circle hole 326 and the outer circle hole 327. Depending upon the manner of placement of the prism units 405 in the scanning discs 365, see Fig. 30, the light may be made to traverse from the inner circle holes to the outer circle holes and vice versa, as illustrated in Fig. 30. The prisms direct the light in a path to match that afforded by the positions of shutters 331 on the central discs 325.

The location of the holes 404 and/or prisms 405 in the discs 365, see Fig. 30, and in the corresponding sets of discs 376, 377 and 378, correspond to the angular displacement of the characters on the type drum, see Figs. 15 and 16, which in this particular instance are 30° apart. Disc 365, as seen in the upper right hand corner of Fig. 22, is intended to contain a complete set of prism units 405, however, some have been left out for clarity. In this figure the prism units have the same radial distance from the axis of rotation of the disc 365 and additionally have the same angular spacing between successive prism units. As mentioned above, it should be understood that the discs 365 and the corresponding decoding discs may have all or a combination of holes 404 or prism units 405, see Fig. 30.

Referring now to Figs. 17, 18, 19 and 30, by way of example, the read-out of a "K" will be explained. Referring first to Fig. 19, it is observed that the "K" as it appears in binary form in the tape is perforated in the "0" and the "1" channel. Referring now to Fig. 30, it will be recalled that the discs corresponding to the "0" channel and the "1" channel (see notation at bottom of Fig. 30), have their shutter elements moved outward radially in each instance by magnet 348, see Fig. 26, to expose the outer circle holes 327 in the respective discs. As there were no perforations in the "X," "8," "4" and "2" channels it is observed that the shutters on the "X," "8," "4" and "2" discs retain their positions so that the inner holes 326 therein are exposed for the passage of light from lamp 397. With respect to discs 365 it is observed that between the "X" and "0" central discs a prism unit 405 is presented which conveys light from the inner circle hole of the "X" disc to the outer hole 327 of the "0" disc. Between the "0" and the "8" central discs the inner leaved disc 365 presents a prism unit 405 which bends the light from the outer circle hole 327 in the "0" disc to the inner circle hole 326 of the "8," "4" and "2" discs and through the holes 404 in the scanning discs interposed therebetween. Between the "2" and the "1" central discs a prism unit 405 carried by the end scanning disc 365 bends the light outwardly from the inner circle path to the outer circle hole 327 from which is passes through slot 399 and lens 400 to impinge upon photocell 395. The light therefore which is emitted from the lamp 397, shown at the right side of Fig. 30, weaves in and out of the apertures and prisms in the disc and impinges on the photocell pickup unit 395 at the left end of the Fig. 30.

This action can likewise be traced through in the schematic form shown in Figs. 17 and 18. Reading of the coded "K" by the tape reading unit 305 is shown in Fig. 17. Contact of conductive fingers 305a on one side of the tape with contactors 305b on the other side sends a pulse from the source of electrical energy battery 305c in this case, through conductors 305d to energize corresponding solenoids 348. The solenoids in turn operate the shutter elements on the associated central discs 325. Thereafter the discs are intermittently stepped through 45° increments, as described above, with the setting imparted to the shutter elements remaining intact during this period. In the particular example shown, and with reference to Fig. 21, readout of the "K" which is being set in the shutter adjacent magnet 348, is not attained until the central discs have been rotated intermittently through five cycles of the type drum because each cycle of the drum corresponds to a 45° stepping of the central discs. When the shutters reach the reading station designated as "K" to "T" at the top of this figure, the discs 365 scan the stopped central discs and for an instant the path of light is through the whole assembly of discs as seen in Figs. 18 and 30. This occurs only when the "K" on the type drum comes into position where is can be printed on the record medium, and at this instant the light is able to weave among the interleaved discs and to impinge on the photocell pickup unit which energizes the proper solenoid 117 through conductor 395a and amplifier 395b to release the hammer to print the "K."

In the aforementioned description of the shift register and decoder 300 the rotation of the central shaft 306 was intermittent and was synchronized with the type drum.

Figure 28:
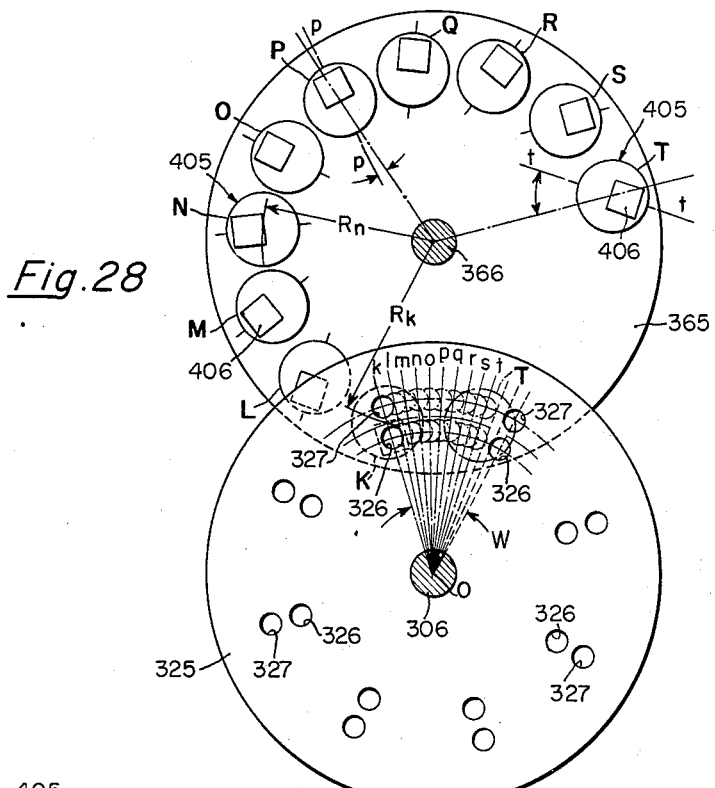
Fig. 28 is a view illustrating another form of operation of the decoder in which the central storage discs and the scanning decoding discs are in constant motion.
Figure 29:
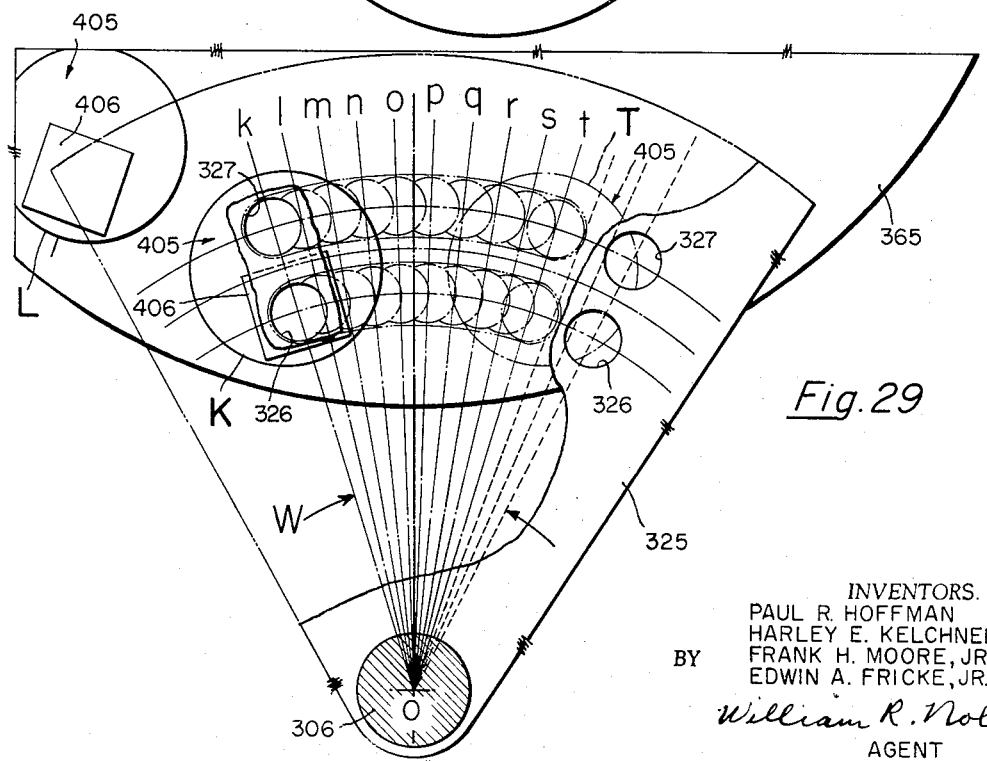
Fig. 29 is a view showing a greatly enlarged portion of Fig. 28 and illustrating successive reading positions of the intersecting discs.

An alternate form of shift register and decoder is concerned with continuously rotation central shaft 306. In other respects the details of operation of the device are similar. Referring now to Fig. 23, the alternate form of the invention is such that power is transmitted to shaft 309, to pinion gear 388, by means of bevel gears 307 affixed to shaft 12 and bevel gear 308 affixed to shaft 309, as described heretofore. As seen in Fig. 23, the spur gear 389, instead of idling on the central shaft 306, as was the case in the aforementioned intermittent form of operation, is now fixed to the central shaft 306. The relationship of the spur gear 389 to the pinion gear 388 is such that one revolution of pinion gear 388 will produce one-eighth of a revolution of the spur gear and a corresponding rotation to shaft 306 to which the spur gear is affixed. Figs. 28, 29 indicate the scanning relationship between the decoding discs 365 and the central discs 325. For the purpose of clarity the shutters 330 have been left off of the central disc 325 in these figures, but it should be understood that the shutters are so set as to carry a certain selected character. The readout of this character occurs as follows: during the time that a given set of inner and outer circle holes 326, 327 of central disc 325 are rotated through the angle W in a clockwise direction, disc 365 will complete a full revolution in a counterclockwise direction.

The successive prism units 405 identified on Fig. 28 as K to T inclusive, will intersect the inner and outer circle holes 326, 327 along the radial lines o—k to o—t inclusive. In Fig. 29 the angles between the lines o—k, o—l, o—m, o—n, etc. are equal. Readout of a "K" will occur when the "K" prism unit intersects holes 326 and 327 along the o—k line, while readout of a "P," for example, will occur when the "P" prisms intersect those holes along the o—p line.

Because the angles of rotation if discs 365 and 325 are opposite to each other it is apparent that the successive prisms on the disc 365 must be located varying distances from the axis of rotation of the disc 365. Thus, for example, the "K" prism is located a distance of $R_k$ while the "N" prism is placed closer to the axis of rotation of the disc and is represented by the distance $R_n$. This follows because the locus of the inner and outer circle holes is such that it curves away from the axis of rotation of the discs 365.

It should further be apparent therefore that inasmuch as the points of readout occur on the locus described in the inner and outer circle holes 326, 327 as the latter are moved through the angle "W," the angles between successive prism units 405 must vary. In addition the angle at which a given prism is turned relative to a radial line drawn through its center and the axis of rotation of the disc must be carefully adjusted. Thus, for example, Fig. 28, it is observed that the axis of the "T" prism t—t is skewed with respect to a radial line through the axis of rotation of the disc 365 and the center of the prism unit, whereas the "P" prism's axis p—p is nearly coincident with a radial line drawn through its center. In Fig. 29 where the "T" prism is indicated in broken lines, it will be seen why the angle of readout of this prism with line o—t is skewed to a radial line passing through the axis of disc 365 and the "T" prism.

Having described a preferred form of the invention it will be understood that other forms thereof will fall within the scope of its teaching and the following claims.

What is claimed is:

1. In a printing mechanism a cylindrical type drum having type characters arranged on its peripheral surface, said characters being arranged in spaced relation with each other in a plurality of separate turns of a helix, means for rotating said drum about its axis, a frame, a plurality of printing hammers carried by said frame and mounted for straight line movement therein parallel to the axis of said drum, each hammer therein being used to print a character of those in one turn of the helix, means for advancing the frame and the type drum in unison along lines parallel to the axis of rotation of the drum an amount equal to the pitch of the helix with each revolution of the drum, means for returning the drum to an initial position for the beginning of a line of print, actuator means rotatable about an axis parallel to the axis of rotation of said drum, said actuator having teeth extending along its length, individual latches in said frame for restraining said hammers from movement relative to said frame, electro-mechanical means for tripping said latches to release said hammers on signal, control means carried by said frame for synchronizing the tripping of said latches with the movement of predetermined characters in the respective turns of the helix past their printing positions, and spring means carried by said frame and engaging each hammer to cause the latter when released to move away from said type drum and into the path of rotation of the teeth on said actuator means whereby it is driven in the reverse direction against said predetermined type characters in timed sequence while said type drum is in motion.

2. In a printing mechanism, a cylindrical type wheel having type characters arranged in a helix around the peripheral surface of the wheel, the inner portion of the wheel including thread portions of the same lead and hand as the helix formed by said characters, a slotted rod mounting said wheel for rotation about and along its axis, toothed rack means supported for movement radially within the slot of said rod, said teeth being shaped to mesh with the internal threads of said type wheel, means for rotating said wheel, and means for moving said rack means radially within the slot of said bar, said rack in one position thereof engaging said rotating wheel to cause the same to be driven axially in one direction along the length of said bar.

3. In a printing mechanism as set forth in claim 2 and further including means operable upon radial movement of said rack to a second position to disengage said rack from said type wheel, and means to return the wheel to an initial position for the starting of a line of print.

4. Printing mechanism comprising, a cylindrical type drum having type characters arranged in a helix around its peripheral surface, the inner portion of said drum including thread portions of the same lead and hand as the helix formed by said characters, a slotted rod mounting said drum for rotation about its axis, toothed rack means supported for movement radially within the slot of said rod, the teeth being shaped to mesh with the internal threads of said type drum, means for rotating said drum about said rod, means for moving said rack means radially within the slot of said rod to and from a position in which said rack engages the teeth in said rotating drum to cause the drum to be driven axially in one direction along the length of said bar, printing hammer means, carriage means for supporting said hammer means for movement along a line parallel to the axis of said rod, means connecting said latter means to said type drum, and means operable upon movement of said rack from its drum engaging position to a disengaged position simultaneously to move said carriage means and said type drum to an initial position for starting of a line of print.

5. In a printer for printing up a record medium, a type drum including groups of type characters contained in a plurality of turns of a multiturn helical path about the periphery of the type drum, means mounting said type drum for rotation and lateral character spacing along a line parallel to its axis of rotation, means for continuously rotating said type drum, said type characters being disposed on said type drum such that characters of each group are successively presented at equally spaced printing positions along a line on the record medium and parallel to the axis of rotation of the type drum as the latter rotates, a plurality of printing hammers one associated with each group of type characters, a carriage for mounting said hammers, means mounting said carriage for lateral character space movement, and means connecting said carriage to said type drum whereby lateral movement of said type drum imparts a like lateral movement to said hammer carriage.

6. In a printer for printing upon a record medium, a type drum carrying type characters arranged in a helical pattern on the outer surface thereof said type drum including an internal thread of the same lead and hand as the helical pattern of the type characters, means supporting said drum for rotation and for lateral movement along its axis of rotation, screw means mounted within said supporting means and shiftable between an operative position in which said screw means engages said internal thread of said type drum and to an inoperative position in which said screw means are disengaged from said internal thread of said type drum and means for rotating said type drum whereby said type drum is caused to move laterally along its axis of rotation when said screw means is in engagement with the internal thread of the type drum.

7. Electromechanical printing apparatus for recording information in response to applied electrical signals, a shaft having a plurality of ridges elongated in a direction parallel to its axis, means for continuously rotating said shaft, a plurality of recording elements adapted to be mechanically engaged by said shaft for recording the information on a record medium, means mounting said recording elements for bodily movement along a line parallel to the axis of rotation of said shaft and for linear movement in a direction normal to said axis, means for moving said mounting means, electromagnetic units having means for receiving said electrical signals, said units including latch means adapted to engage said recording elements to lock the latter against said linear movement, said units being responsive to applied electrical signals to disengage said latch means from said recording elements to permit movement of the latter, and means connected to said mounting means and to said recording elements for linearly moving the latter to engage the ridges on said shaft during bodily movement thereof.

8. Electromechanical printing apparatus for recording information in response to an applied electrical signal, a shaft having a plurality of teeth thereon elongated in a direction parallel to its axis of rotation, means for continuously rotating said shaft, a recording element adapted to be engaged by said source for recording the information, means mounting said recording element for bodily movement along a line parallel to the axis of rotation of said shaft and for linear movement in a direction normal to said axis, means for moving said mounting means parallel to said axis, an electromagnetic unit having means for receiving an applied electrical signal and including latch means adapted to engage said recording element to lock the same against said linear movement, said unit being responsive to an applied signal to disengage said latch means from the recording element to permit linear movement thereof, and means for moving said recording element to be energized from said shaft to record.

9. In a printing apparatus, a rotatable type drum movable along its axis of rotation, means for biasing said type drum to an initial position at one end of its travel, means for moving said drum including integral internal threads within said type drum, and toothed rack means engageable with said internal threads and disposed parallel to said axis of rotation, means for continuously rotating said type drum whereupon said threads and said rack when engaged are operative to uniformly move said type drum axially against the action of said biasing means, and means for disengaging said rack means from said internal threads whereupon said biasing means is operative to return said type drum to said initial position.

10. Electromechanical printing apparatus for recording information in response to applied electrical signals, a rotatable type drum movable along its axis of rotation a plurality of recording elements adapted to be mechanically coupled to a source of mechanical energy to cause said elements to strike said type drum for recording information on a record medium, means mounting said recording elements for bodily movement along a line parallel to the axis of rotation of said shaft, means connecting said type drum to said mounting means, means for biasing said type drum and said mounting means to an initial position at one end of their travel, feeding means for said drum including internal thread means within said type drum and toothed rack means engageable with said internal thread means, said rack means being disposed parallel to said axis of rotation means for continuously rotating said type means whereupon said internal thread means and said rack, when engaged, are operative to move said type drum axially thereby producing a corresponding movement of said means mounting said recording elements, the movement of said type drum and said means mounting the recording elements being against the action of said biasing means, and means for disengaging said rack means from said internal thread means whereupon said biasing means is operative to return said type drum and said means mounting said recording elements to their initial positions.

11. Apparatus according to claim 10 wherein ratchet means are operatively associated with said mounting means for said recording elements for preventing the return of said mounting means and said type drum to their initial positions upon disengagement of said rack means from the internal thread means within said type drum.

12. Apparatus according to claim 11 and further including means to disable said ratchet means to permit said biasing means to return said type drum and recording elements to said initial positions.

13. A construction according to claim 12 wherein said ratchet means includes a pawl mounted on said recording element mounting means, a rack having teeth engageable by said pawl, and means for rotating said rack out of engagement with said pawl.

14. In a printing apparatus for printing upon a record medium, a type carrier drum adapted to travel along its axis of rotation, carriage means for supporting said drum, means for moving said carriage between open and closed positions, a plurality of recording elements adapted to be accelerated toward said type means, means mounting said recording elements for movement along a line parallel to the axis of rotation of said type drum, means for moving the type drum along its axis of rotation, means connecting said mounting means to said type drum whereby movement of the latter produces a like movement of the mounting means, means for biasing said type drum and said mounting means to their initial positions at one end of their travel, and fluid means adapted to engage said type drum and said mounting means when the latter and the drum are moved to said initial positions with said carriage in its closed position, thus to cushion the return to said initial positions.

15. Apparatus as descrbed in claim 14 and further including means to disable said cushion means upon movement of said carriage to its open position.

16. In a printing apparatus for recording information in response to applied electrical signals, a cylindrical drum having type characters arranged in alternate turns of a multiturn helix around the peripheral surface of the drum, means for simultaneously rotating the drum about an axis and for continuously advancing the same along said axis in a character spacing manner, a source of mechanical energy, a plurality of recording elements adapted to be mechanically coupled to said source, electromagnetic means for receiving said applied signals and including latch means adapted to lock said elements against movement, said electromagnetic means being responsive to the applied signals to permutably disengage preselected latch means from one of said recording elements to permit movement thereof, and means connected to said recording elements for positioning said disengaged recording elements to render the same energizable from the source.

17. In a printing apparatus for recording information in response to applied electrical signals, a cylindrical drum having type characters arranged in alternate turns of a multiturn helix around the peripheral surface of the drum, means for simultaneously rotating the drum about an axis and for continuously advancing the same along said axis in a character spacing manner, a source of mechanical energy including a rotatable shaft parallel to said axis and having a plurality of teeth elongated in a direction parallel to its axis of rotation, means for continuously rotating said shaft, a plurality of recording elements adapted to be mechanically coupled to said source for recording the information, means mounting said recording elements for bodily movement along a line parallel to the axis of rotation of said shaft and for linear movement in a direction normal to said axis, means for moving said mounting means, electromagnetic means for receiving said applied signals and including latch means adapted to lock said elements against linear movement, said electromagnetic means being responsive to the applied signals to permutably disengage said latch means from ones of said recording elements to permit movement thereof, and means connected to said mounting means and said recording elements for linearly moving said disengaged ones of said recording elements to mechanically couple the same to said source during bodily movement thereof.

18. In the apparatus as defined in claim 17 wherein each recording element includes a striking face have a dimension equal to twice the width of an individual type character on said type drum.

19. Electromechanical printing apparatus for recording information in response to applied electrical signals, a rotatable type drum movable along its axis of rotation, groups of type characters, each group arranged within an alternate turn of a multiturn helix disposed about the peripheral surface of said drum, a plurality of recording elements corresponding in number to said groups of type and each element cooperable with the characters contained in a given alternate turn of said helix, a source of mechanical energy including a rotatable shaft, means mounting said recording elements for bodily movement in unison with said type drum along a line parallel to said axis of rotation, electromagnetic units supported by said mounting means for receiving applied signals and including latch means in one position thereof adapted to lock said recording elements against movement in a direction normal to the axis of rotation of said type drum, said electromagnetic units being responsive to the applied signals to permutably move said latch means to another position to unlock ones of said recording elements to permit movement thereof in said normal direction, and means connected to said mounting means and said recording elements for moving said unlocked recording elements into engagement with said power source to transfer energy from the source to the moved recording elements, whereby the same are accelerated toward the type drum.

20. A printing mechanism comprising, a plurality of type elements, means for moving said type elements successively through a printing position, a printing hammer, means mounting said printing hammer for straight-line reciprocatory movements, abutment means on said printing hammer, latch means releasably holding said hammer in an intermediate position between said printing position and a retracted position, means for releasing said latch means, means operable upon release of said latching means for biasing said hammer toward its retracted position, power actuator means comprising a rotatably mounted cylindrically shaped member having projections extending from its periphery, means for rotating said power actuator with its projections moving through an arc intersecting the path of movement of said abutment means when said hammer is moving from said intermediate position toward said retracted position upon release of said latch means, whereby a projection is effective to forceably contact said abutment means and drive said hammer in the opposite direction to said printing position thus to effect printing by a type element, said hammer biasing means and said latch means being effective to return and releasably hold said hammer in said intermediate position ready for a subsequent printing operation.

References Cited in the file of this patent

UNITED STATES PATENTS

| 950,473 | Campbell | Mar. 1, 1910 |
|---|---|---|
| 1,405,722 | Siepmann | Feb. 7, 1922 |
| 2,066,784 | Lake | Jan. 5, 1937 |
| 2,227,143 | Knutsen | Dec. 31, 1940 |
| 2,566,944 | Last | Sept. 4, 1951 |
| 2,766,686 | Fomenko et al. | Oct. 16, 1956 |
| 2,776,618 | Hartley | Jan. 8, 1957 |
| 2,800,073 | Block | July 23, 1957 |
| 2,805,620 | Rosen | Sept. 10, 1957 |
| 2,824,513 | Johnson | Feb. 25, 1958 |
| 2,831,424 | MacDonald | Apr. 22, 1958 |